United States Patent
Abouelseoud et al.

(10) Patent No.: US 10,972,895 B2
(45) Date of Patent: Apr. 6, 2021

(54) MULTI-BSS DISCOVERY ASSISTANCE

(71) Applicant: SONY CORPORATION, Tokyo (JP)

(72) Inventors: Mohamed Abouelseoud, San Francisco, CA (US); Kazuyuki Sakoda, Campbell, CA (US)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/354,998

(22) Filed: Mar. 15, 2019

(65) Prior Publication Data

US 2020/0204975 A1    Jun. 25, 2020

Related U.S. Application Data

(60) Provisional application No. 62/781,780, filed on Dec. 19, 2018.

(51) Int. Cl.

| H04W 8/00 | (2009.01) |
|---|---|
| H04W 16/28 | (2009.01) |
| H04W 4/70 | (2018.01) |
| H04W 48/16 | (2009.01) |
| H04W 72/04 | (2009.01) |
| H04W 8/24 | (2009.01) |

(52) U.S. Cl.
CPC ............ *H04W 8/005* (2013.01); *H04W 4/70* (2018.02); *H04W 8/24* (2013.01); *H04W 16/28* (2013.01); *H04W 48/16* (2013.01); *H04W 72/046* (2013.01); *H04W 72/0446* (2013.01)

(58) Field of Classification Search
CPC ......... H04W 8/005; H04W 4/70; H04W 8/24; H04W 16/28; H04W 48/16; H04W 72/0446; H04W 72/046
See application file for complete search history.

(56) References Cited

U.S. PATENT DOCUMENTS

| 2011/0199918 A1 | 8/2011 | Sampath et al. |
| 2011/0264780 A1* | 10/2011 | Reunamaki ............ H04L 67/16 |
| | | 709/223 |

(Continued)

FOREIGN PATENT DOCUMENTS

WO    2014152853    9/2014

OTHER PUBLICATIONS

ISA/EPO, European Patent Office (EPO), International Search Report and Written Opinion dated Nov. 20, 2019, related PCT international application No. PCT/IB2019/057836, pp. 1-20, claims searched, pp. 21-26.

(Continued)

*Primary Examiner* — Brian D Nguyen
(74) *Attorney, Agent, or Firm* — O'Banion & Ritchey LLP; John P. O'Banion

(57) ABSTRACT

A wireless communication apparatus/system/method utilizing directional data transmission over a communication (e.g., mmW) band and propagating discovery assistance (DA) request and responses to neighboring stations (e.g., in its BSS or in the surrounding area) and performing cooperative discovery with other BSS to increasing network efficiency. Discovery assistance requests include a discovery assistance element and a DMG capability element of the first neighboring station, which is propagated to other stations in the BSS of AP/PCP station.

20 Claims, 26 Drawing Sheets

(56) References Cited

U.S. PATENT DOCUMENTS

| | | | |
|---|---|---|---|
| 2014/0022986 A1* | 1/2014 | Wu | H04W 48/16 |
| | | | 370/328 |
| 2016/0044711 A1* | 2/2016 | Lou | H04B 7/0617 |
| | | | 370/338 |
| 2016/0270136 A1* | 9/2016 | Liu | H04W 48/16 |
| 2017/0064583 A1 | 3/2017 | Roy et al. | |
| 2017/0195035 A1* | 7/2017 | Calcev | H04B 7/0452 |
| 2018/0184365 A1* | 6/2018 | Gidvani | H04W 24/02 |
| 2018/0331914 A1 | 11/2018 | Yoshida et al. | |
| 2018/0368057 A1* | 12/2018 | Asterjadhi | H04W 48/10 |
| 2019/0132724 A1* | 5/2019 | Asterjadhi | H04W 8/005 |
| 2019/0254066 A1* | 8/2019 | Ma | H04W 74/006 |
| 2019/0349782 A1* | 11/2019 | Kim | H04B 7/063 |

OTHER PUBLICATIONS

Abouelseoud, Mohamed (SONY): "Proposed resolution of CID 3518", IEEE Draft; 11-18-1911-0-00AY-Proposed-Resolution-of-CID-3518; vol. 802.11ay, No. 1; Nov. 14, 2018; pp. 1-13; XP068133332.
Abouelseoud, Mohamed (SONY): "Proposed resolution of CID 3518 text", IEEE Draft; 11-18-1910-00-00AY-Proposed-Resolution-of-CID-3518-Text; vol. 802.11ay; Nov. 13, 2018; pp. 1-6; XP068133330.
Abouelseoud, Mohamed (SONY): "proposed resolution of cid 3518", IEEE Draft; 11-19-0019-00-00AY-Proposed-Resolution-of-CID-3518; vol. 802.11ay; Jan. 16, 2019; pp. 1-16, XP068147803.
Abouelseoud, Mohamad (SONY): "Proposed resolution of CID 3518 text", IEEE Draft; 11-19-0020-00-00AY-Proposed-Resolution-of-CID-3518-Text; vol. 802.11ay; Jan. 16, 2019; pp. 1-8; XP068147805.

* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|

Octets: 2    2    6    6    3    3    4

FIG. 7
(Prior Art)

| B0 | B1    B9 | B10    B15 | B16  B17 | B18    B23 |
|---|---|---|---|---|
| Direction | CDOWN | Sector ID | DMG Antenna ID | RXSS Length |

Bits: 1    9    6    2    6

FIG. 8
(Prior Art)

| B0    B8 | B9  B10 | B11    B15 | B16 | B17    B23 |
|---|---|---|---|---|
| Total sectors in ISS | Number of RX DMG antennas | Reserved | Poll Required | Reserved |

Bits: 9    2    5    1    7

FIG. 9A
(Prior Art)

| B0    B5 | B6  B7 | B8    B15 | B16 | B17    B23 |
|---|---|---|---|---|
| Sector select | DMG Antenna select | SNR report | Poll Required | Reserved |

Bits: 6    2    8    1    7

FIG. 9B
(Prior Art)

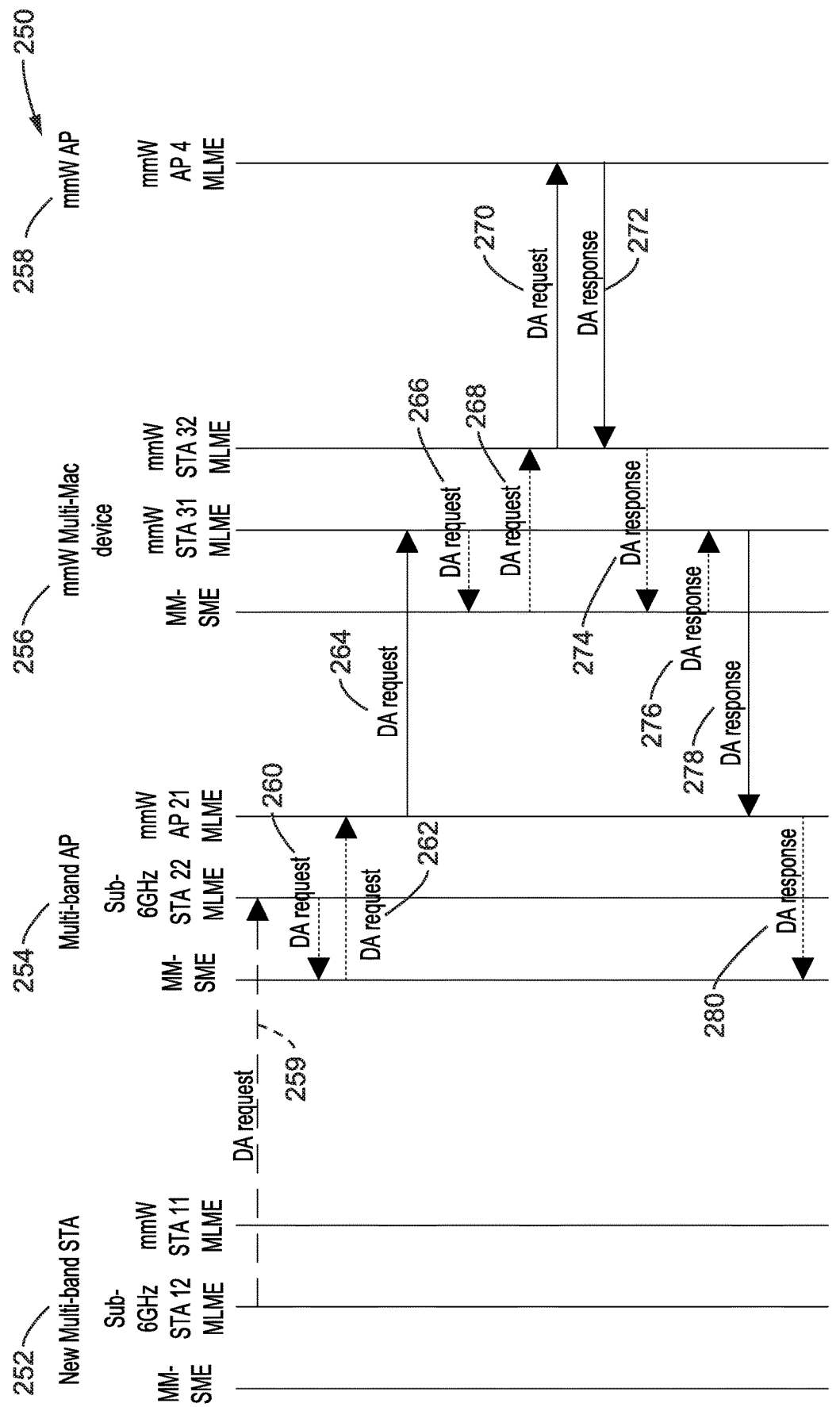

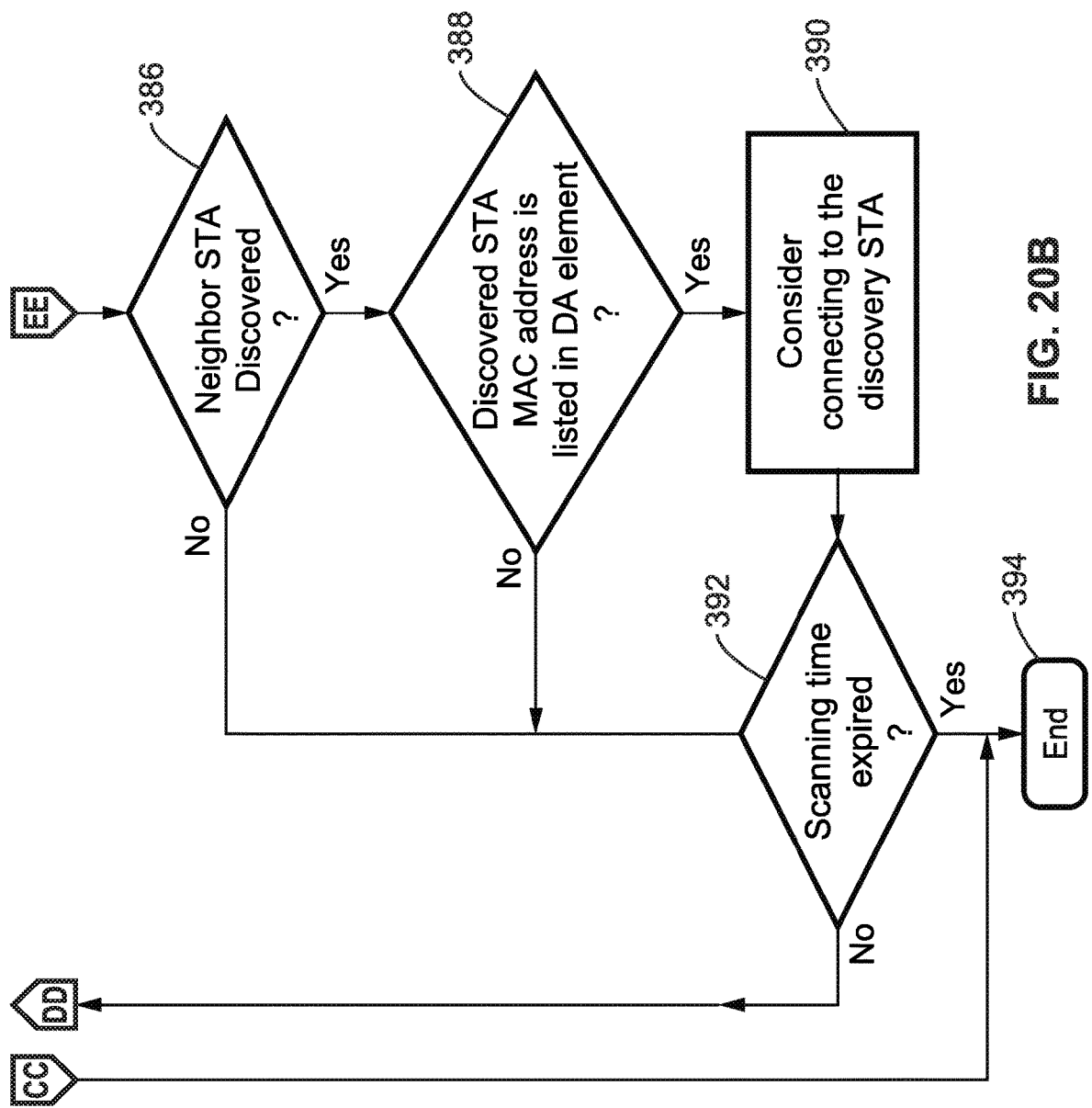

| Element ID | Length | Element ID Extension | Discovery Assistance Control | Beamforming Start TSF | Discovery Assistance Window Length | Number of Discovery Assistance Windows | Discovery Assistance Window Period | ... |
|---|---|---|---|---|---|---|---|---|
| 1 | 1 | 1 | 3 | 4 | 2 | 1 | 2 | |

Octets:

530

| Dwelling Time | Temporary AID | Number of STAs Providing Discovery Assistance | MAC Address of STA 1 | ... | MAC Address of STA N |
|---|---|---|---|---|---|
| 2 | 1 | 1 | 6 | | 6 |

| Allocation Control | BF Control | Source AID | Destination AID | Allocation Start | Allocation Block Duration | Number of Blocks | Allocation Block Period |
|---|---|---|---|---|---|---|---|
| 2 | 2 | 1 | 1 | 4 | 2 | 1 | 2 |

Octets:

FIG. 28 — 580

| B0 B3 | B4 B6 | B7 | B8 | B9 | B10 | B11 | B13 B15 |
|---|---|---|---|---|---|---|---|
| Allocation ID | Allocation Type | Pseudo-static | Truncatable | Extendable | PCP Active | LP SC Used | Reserved |
| 4 | 3 | 1 | 1 | 1 | 1 | 1 | 4 |

Bits:

FIG. 29 — 590

| Element ID | Length | STA Address | AID | DMG STA Capability Information | DMG AP OR PCP Capability Information | DMG STA Beam Tracking TimeLimit | Extended SC MCS Capabilities | Maximum Number of Basic A-MSDU Subframes in A-MSDU | Maximum Number of Short A-MSDU Subframes in A-MSDU |
|---|---|---|---|---|---|---|---|---|---|
| 1 | 1 | 6 | 1 | 8 | 2 | 2 | 1 | 1 | 1 |

Octets:

600

| B0 | B1 | B2 | B3 | B4 B5 | B6 | B7 B13 |
|---|---|---|---|---|---|---|
| Reverse Direction | High Layer Timer Synchronization | TPC | SPSH and Interference Mitigation | Number of RX DMG Antennas | Fast Link Adaptation | Total Number of Sectors |

Bit: 1 1 1 1 2 1 7

| B14 B19 | B20 | B21 B26 | B27 | B28 B51 | B52 |
|---|---|---|---|---|---|
| RXSS Length | DMG Antenna Reciprocity | A-MPDU Parameters | BA with Flow Control | Supported MCS Set | DTP Supported |

Bit: 6 1 6 1 24 1

| B53 | B54 | B55 | B56 | B57 B59 | B60 | B61 | B62 | B63 |
|---|---|---|---|---|---|---|---|---|
| A-PPDU Supported | Heartbeat | Supports Other_AID | Antenna Pattern Reciprocity | Heartbeat Elapsed Indication | Grant ACK Supported | RXSSTxR ATE Supported | Discovery assistance Supported | Reserved |

Bit: 1 1 1 1 3 1 1 1 1

FIG. 30

| Category | DMG Action | Subject address | Request element | Zero or more DMG Capabilities elements | Zero or more Provided Elements | Zero or more Extended Request elements |
|---|---|---|---|---|---|---|

| Category | DMG Action | Subject address | Zero or more DMG Capabilities elements | Zero or more requested elements | Zero or more provided Request elements |
|---|---|---|---|---|---|

MULTI-BSS DISCOVERY ASSISTANCE

CROSS-REFERENCE TO RELATED APPLICATIONS

This application claims priority to, and the benefit of, U.S. provisional patent application Ser. No. 62/781,780 filed Dec. 19, 2018, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to directional wireless local area network (WLAN) communications, and more particularly to the propagation of discovery assistance request and responses to neighboring stations even when in another BSS.

2. Background Discussion

Increased capacities are eagerly sought for wireless local area networks (WLANs), especially in the millimeter wavelength (mm-Wave or mmW) regimes. Network operators have begun to embrace various concepts to achieve densification, such as in the Millimeter wave (mmW) regime including mesh networks and mixtures of mesh and non-mesh networks, are becoming increasingly important. Current sub-6 GHz wireless technology is not sufficient to cope with high data demands. One alternative is to utilize additional spectrum in the 30-300 GHz band which is often referred to as the millimeter wave band (mmW).

The efficient use of mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up in a location it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A station connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

However, the need for STAs to be constantly sending discovery signals (beacons or beamforming frames) makes inefficient use of spectrum while increasing latencies with transmissions being constantly interrupted to send beamforming signals even when they are not needed. In addition, Accordingly, a need exists for enhanced discovery mechanisms which enhance internodal cooperation leading to enhanced network efficiencies. The present disclosure fulfills that need and provides additional benefits over previous technologies.

BRIEF SUMMARY

A protocol is disclosed which increases the efficiency of propagating discovery assistance between nodes (stations) in the network even when they are in other BSSs. Stations (STAs) that receive discovery assistance requests from a new STA trying to join a network or STAs that need to discover neighbor STAs can propagate the discovery assistance request to other STAs in its BSS to find new neighbor STAs. The STA that received the propagated discovery assistance response forwards this request to other STAs in its device group, and if it operates another BSS or if the device has multiple STAs in it, after which the STA awaits a response to the request. If a response is received from the other BSS AP, the STA forwards this response to the AP connected to the new STA. The AP connected to the STA collects all responses from neighboring BSSs and forwards one response including all discovery assistance campaign details to the new STA. The new STA is informed about the other BSSs willing to offer discovery assistance and the details of the discovery assistance campaign.

The disclosed protocol overcomes a number of issues with prior station programming. In many wireless protocols STAs in the network must be continuously sending discovery signal (beacons or beamforming frames) which makes inefficient use of the spectrum and increases system latencies where transmissions need to be interrupted continuously to send beamforming signals even when they are not needed.

It will be noted that new STAs are using multi-band discovery assistance to find an AP to establish a mmW connection with. The new STA connects to an AP that supports multi-band discovery assistance through the lower band and requests discovery assistance on the mmW band. In some cases the discovered AP on the lower band might not be reachable through the mmW band due to blockage or limited coverage of mmW band. Therefore, the protocol is configured so that the new STA discovers other neighboring APs and STAs in other BSSs that are connected to the AP with multi-band capability and have mmW connectivity.

The directional WLAN system, apparatus and method disclosed is applicable to a wide range of network applications, for example device-to-device (D2D), peer-to-peer (P2P), wireless and mesh networking applications which can be applied to wireless LAN (WLAN), wireless personal area networks (WPAN), and outdoor wireless communications. The target applications for example include, but are not limited to, Wi-Fi, WiGig, and other wireless networks, Internet of things (IoT) applications, backhauling and fronthaul of data, indoor and outdoor distribution networks, mesh networks, next generation cellular networks with D2D communications, and numerous other applications as will be readily recognized by one of ordinary skill in the art.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

FIG. 20A and FIG. 20B is a flow diagram of a new STA receiving DA response and starting the DA campaign scanning according to an embodiment of the present disclosure.

FIG. 24 is a data field diagram of a Discovery Assistance (AD) information element (IE) according to an embodiment of the present disclosure.

FIG. 27 is a data field diagram of a subfield format for allocations depicted in FIG. 26 according to an embodiment of the present disclosure.

FIG. 28 is a data field diagram of Allocation Control subfield formats according to an embodiment of the present disclosure.

FIG. 29 is a data field diagram of a DMG capability element according to an embodiment of the present disclosure.

FIG. 30 is a data field diagram of subfields within the DMG STA Capability Information subfield shown in FIG. 29 according to an embodiment of the present disclosure.

FIG. 31 is a data field diagram of an Information Request frame according to an embodiment of the present disclosure.

FIG. 32 is a data field diagram of an Information Response frame according to an embodiment of the present disclosure.

DETAILED DESCRIPTION

1. Definition of Terms

Figure 1:
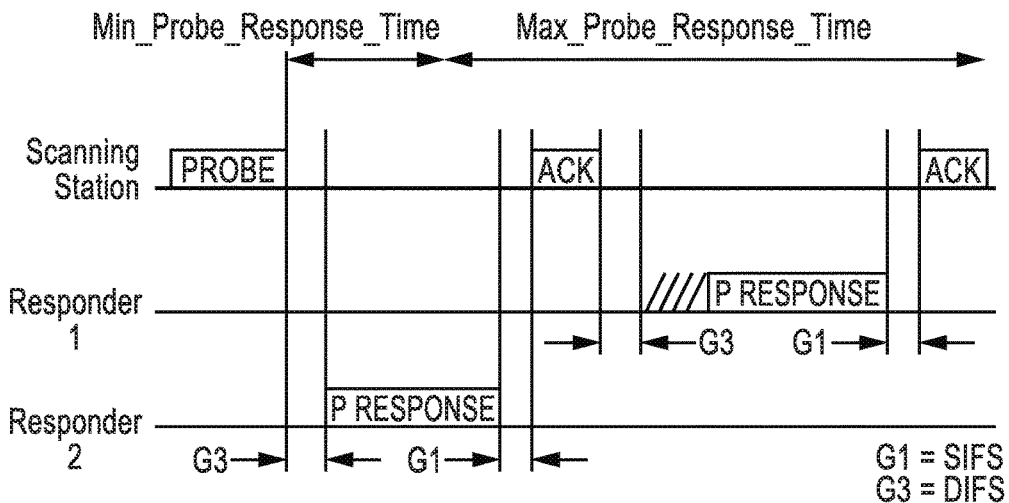
FIG. 1 is a timing diagram of active scanning performed in an IEEE 802.11 wireless local area network (WLAN).

A number of terms are utilized in the disclosure whose meanings are generally described below.

A-BFT: Association-Beamforming Training period; a period announced in the beacons that is used for association and beamform (BF) training of new stations (STAs) joining the network.

AID: Association Identification, is an identifier for the data link association between a station and an AP/PCP or BSS.

AP: Access Point: an entity that contains one station (STA) and provides access to the distribution services, through the wireless medium (WM) for associated STAs.

Beamforming (BF): a directional transmission from a directional antenna system or array for determining information for improving received signal power or signal-to-noise ratio (SNR) at the intended receiver, and under which stations can obtain information for correlating time and directional allocation information.

BSS: Basic Service Set is a set of stations (STAs) that have successfully synchronized with an AP in the network.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a component of the IEEE 802.11 WLAN architecture, built around a BSS which is actually a set of STAs connecting to the wireless medium allowing the STAs to communicate with each other.

BTI: Beacon Transmission Interval is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

DMG: Directional Multi-Gigabit is a form of high throughput wireless communications described in IEEE 802.

EDMG: Extended Directional Multi-Gigabit is an extended form of DMG.

FST: Fast Session Transfer is the transfer of a session from one physical channel to another channel when the communicating STAs both have similar capabilities in the frequency band over which they communicate. It should be noted that during a communication session the STAs retain state information about the established PHY link.

DTI: Data Transfer Interval is the period in which full BF training is permitted followed by actual data transfer, and DTI can include one or more service periods (SPs) and contention-based access periods (CBAPs).

LOS: Line-of-Sight, a communication in which the transmitter and receiver are ostensibly within sight of one another, and not the result of communication of a reflected signal; the opposite condition is NLOS for non-line-of-sight in which stations are not in LOS of one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

MCS: Modulation and Coding Scheme; defines an index that can be translated into the physical (PHY) layer (e.g., OSI model) data rate.

Omni-directional: a mode of transmission utilizing a non-directional antenna.

PBSS: Personal Basic Service Set (PBSS) defined in 802.1ad, which is similar to an independent BSS (IBSS), but the PBSS is a type of IEEE 802.11 ad hoc network in which STAs are able to communicate directly with each other without relying on special devices like APs.

PCP: PBSS Control Point; in an ad-hoc network one of the participating stations can take the role of the PBSS Control Point, which acts similarly to an AP, announcing the network and organizing accesses.

Quasi-Omni directional: is a mode of communication utilizing a directional multi-gigabit (DMG) antenna with the widest beamwidth attainable.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SSID: service Set Identifier is the name assigned to a WLAN network.

STA: Station is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information is collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector Sweep (SSW) or Directional Multi-gigabit (DMG) Beacon frames via different sectors, in which a sweep is performed between consecutive transmissions.

2. Existing Directional Wireless Network Technology 2.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

2.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
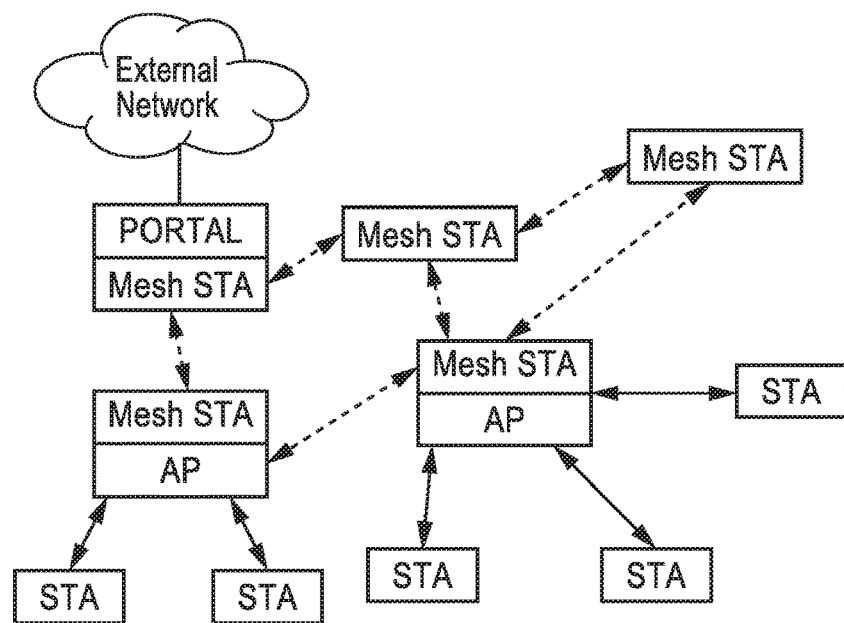
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
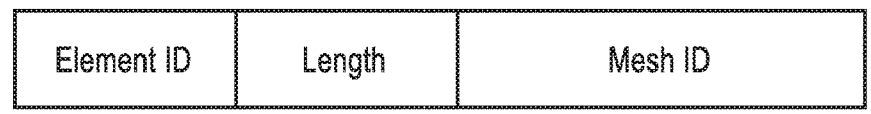
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

2.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11ay define procedures for scanning and beamforming for directional transmission and reception over the millimeter wave band.

2.4. IEEE 802.11ad Scanning and BF Training

An example of a mmW WLAN state-of-the-art system is the 802.11ad standard.

2.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

2.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

2.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provides the best link quality (e.g. SNR), or will otherwise support communications between the stations.

Figure 5:
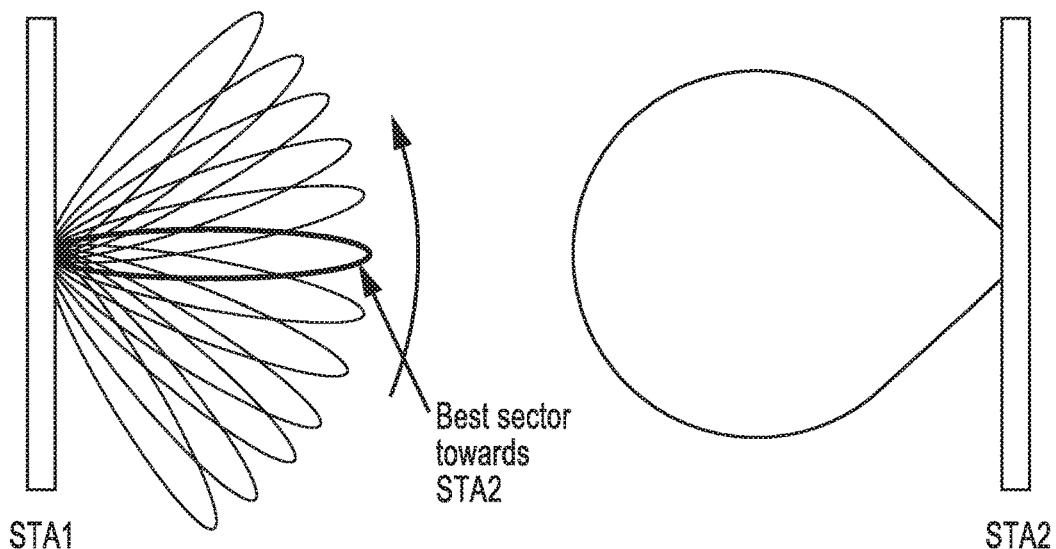
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
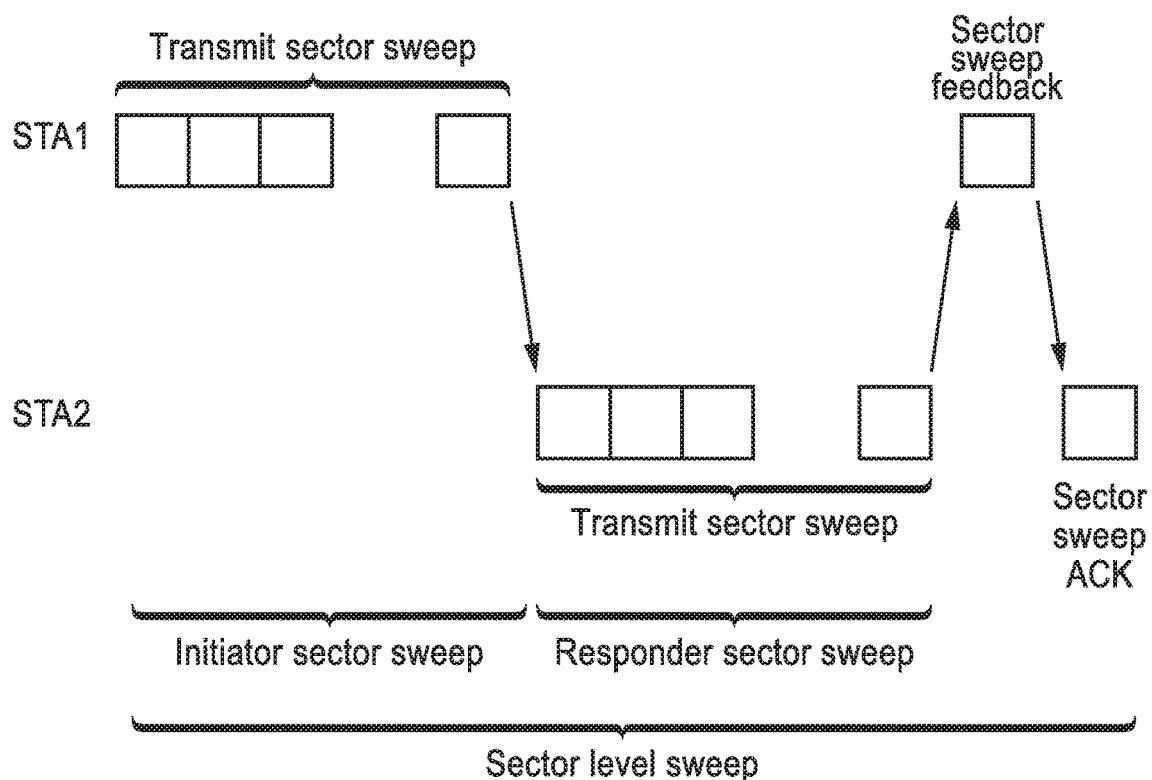
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

2.5. AODV Routing Protocol

Figure 10A:
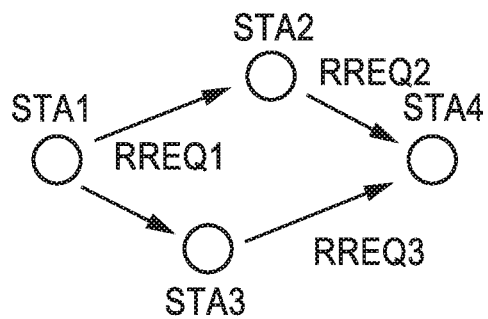
FIG. 10A through FIG. 10C is a network topology diagram of an Ad-hoc On-Demand Distance Vector (AODV) routing protocol.
Figure 10B:
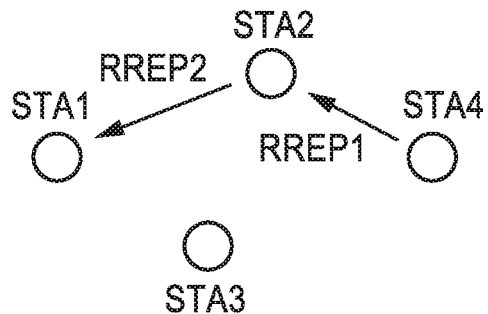
Figure 10C:
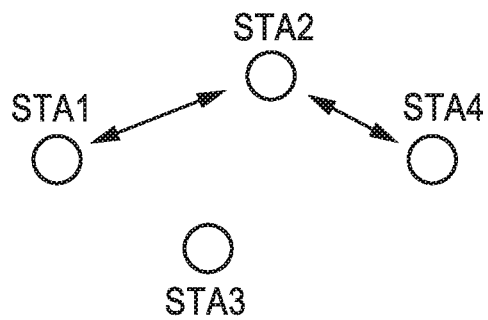

FIG. 10A through FIG. 10C illustrates an example of using an Ad-hoc On-Demand Distance Vector (AODV) routing protocol. A routing protocol is a set of rules to establish a communication path between an originating station (STA) and a destination STA over multiple hops (Intermediate STAs). AODV is a routing protocol which represents the general essence of current multi-hop routing over a wireless media. With AODV, STAs generates a route according to the following steps as seen in the example of FIG. 10A through FIG. 10C.

Steps 1 through 5 of this AODV routing process are see in FIG. 10A. (1) STA 1 is the originating STA and it broadcasts Routing Request (RREQ) frames (RREQ1). (2) STA 2 receives the RREQ1 and measures quality of the link between itself and the transmitter of the RREQ1 (STA 1), and rebroadcasts the RREQ embedding the link quality info and transmitting a routing request (RREQ2). (3) STA3 receives RREQ1, measures quality of the link between itself and transmitter of the RREQ1 (STA1), and rebroadcasts the RREQ embedding the link quality info (RREQ3). (4) STA4 as the destination STA receives RREQ2 from STA2, measures quality of the link between itself and the transmitter of the RREQ2 (STA2), and accumulates the value with link quality embedded in the RREQ2. In response to this process STA4 obtains information on the end-to-end quality to and from STA1 via STA2. (5) STA4 also receives an RREQ3 from STA3, measures quality of the link between itself and the transmitter of the RREQ3 (STA3), and accumulates the value with the link quality embedded in RREQ3. Accordingly, STA4 also obtains information on the end-to-end quality to and from STA1 via STA3.

Steps 6 through 8 of this AODV routing process are depicted in FIG. 10B. (6) STA4 determines that the link quality to STA1 via STA2 is better (e.g., higher signal-to-noise ratio (SNR)) than via STA3, and so STA4 transmits a routing response (RREP) frame (RREP1) to STA2 to confirm the best route to intermediate and originating STAs, and sets STA2 as the next hop STA toward STA1. (7) STA2 receives this RREP1 from STA4, and recognizes itself as an intermediate STA between STA4 and STA1, and set STA4 as its next hop STA toward STA4. (8) STA2 then further retransmits the RREP (RREP2) toward originating STA1, and sets STA1 as the next hop STA toward STA1.

Steps 9 through 10 of this AODV routing process are depicted in FIG. 10C. (9) STA1 receives RREP2 from STA2, and recognizes that the multi-hop path toward STA4 has been confirmed and the next hop STA to STA4 is STA2. (10) In response to the above sequence, a bidirectional route between STA1 and STA4 via STA2 is established.

3. Station (STA) Hardware Configuration

Figure 11:
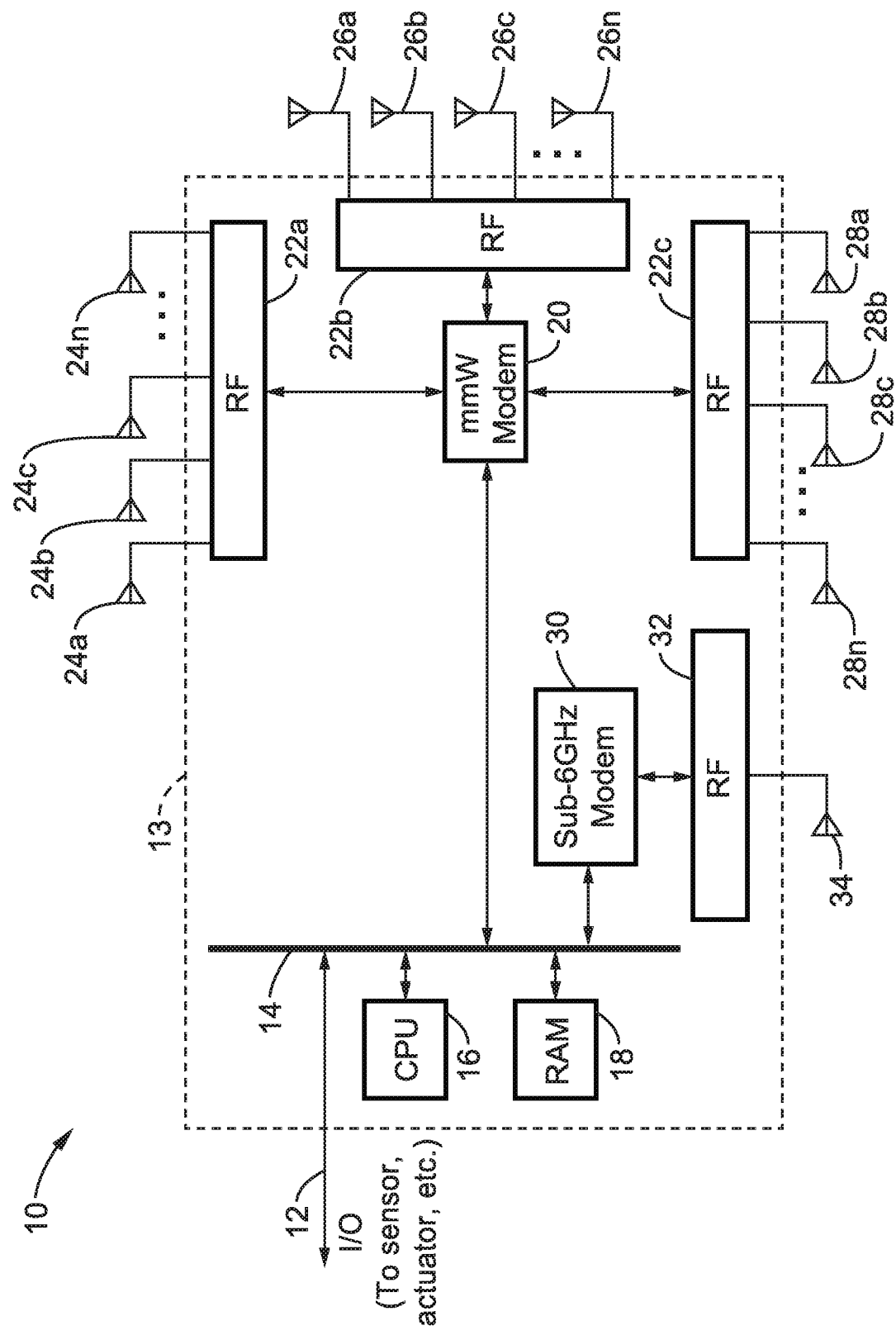
FIG. 11 is a block diagram of a WLAN communications station hardware as utilized according to an embodiment of the present disclosure.

FIG. 11 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a-24n, 26a-26n, 28a-28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
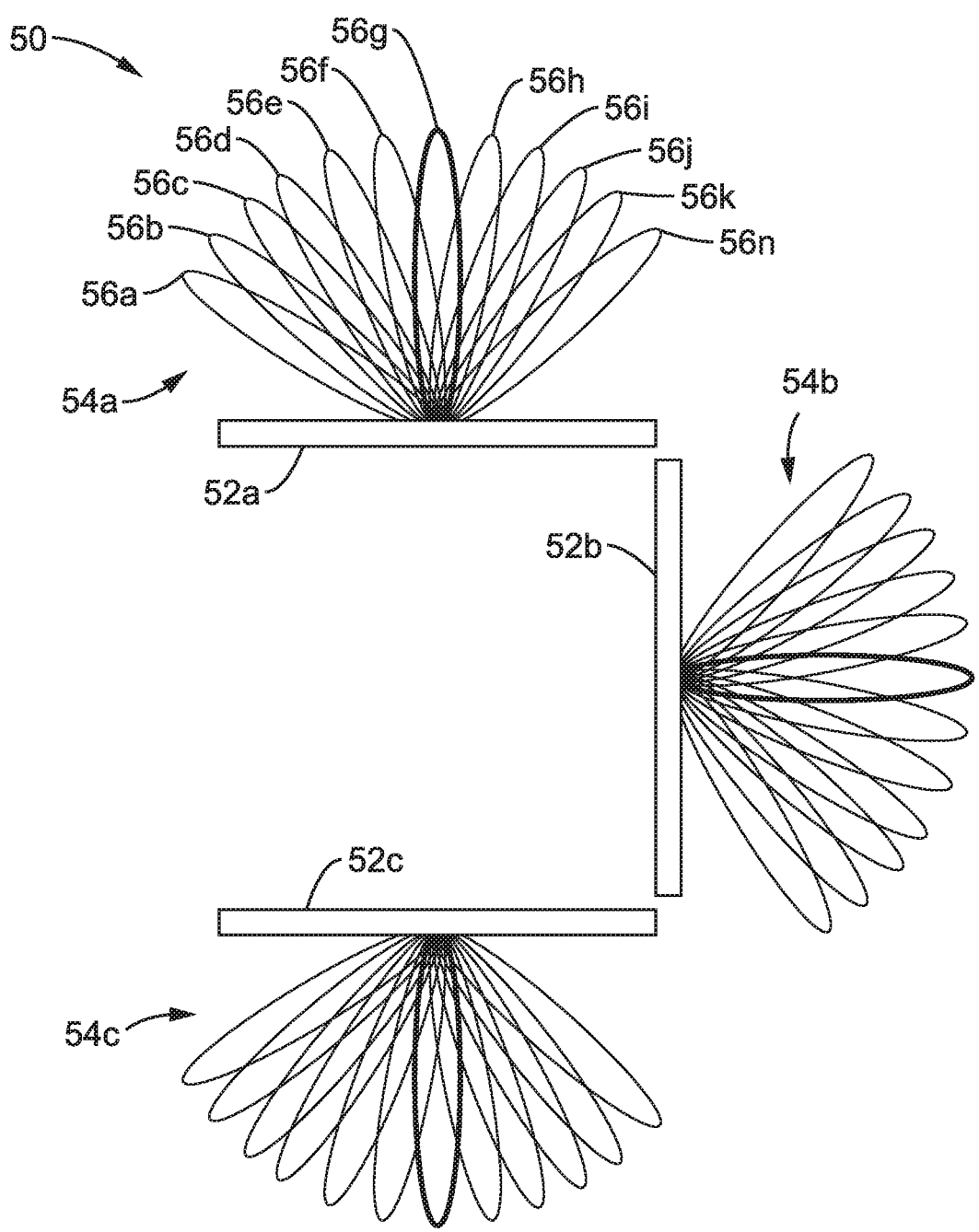
FIG. 12 is a beam pattern diagram for a discovery band communications Omni-antenna, or Quasi-Omni-antenna, (i.e., sub-6 GHz), according to an embodiment of the present disclosure.

FIG. 12 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuity and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

It should be appreciated that the present disclosure can support stations using Quasi-Omni-directional and/or Omni-directional communications, wherein reference to one of these types in the specification generally implies the other as well.

4. Network Topology Example under Consideration

Figure 13:
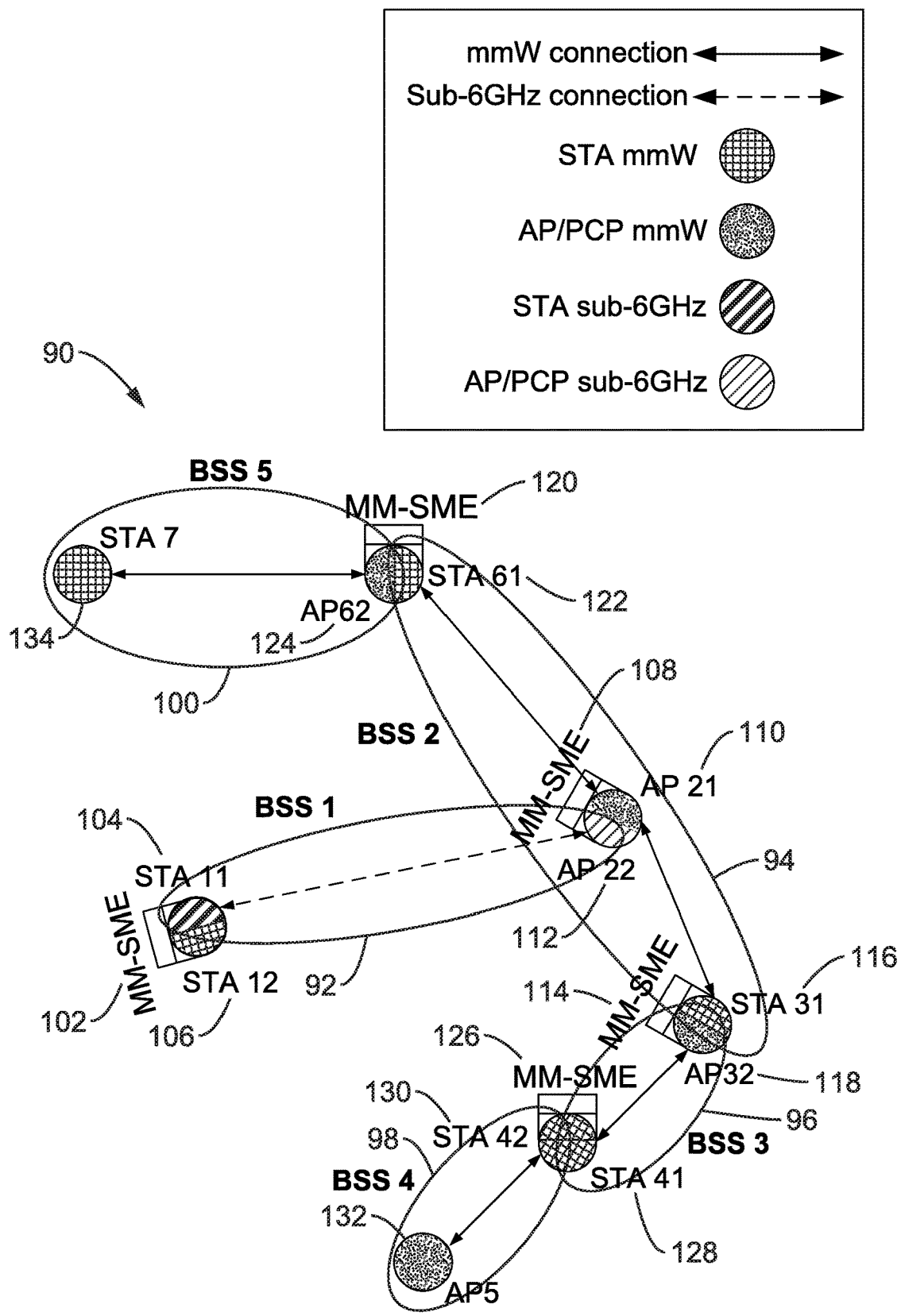
FIG. 13 is a signaling and directional beam diagram of an example topology showing extending the WLAN by connecting different BSSs through devices that have multiple STAs according to an embodiment of the present disclosure.

FIG. 13 illustrates an example embodiment 90 of a topology being considered showing multiple BSS, with BSS 1 92, BSS 2 94, BSS 3 96, BSS 4 98, and BSS 5 100. A number of stations are AP/PCPs and STAs and their associated MM-SME, with STA11 104 and STA12 106 on MM-SME 102, AP21 110 and AP22 112 on MM-SME 108, STA31 116 and AP32 118 on MM-SME 114, STA61 122 and AP62 124 on MM-SME 120, STA41 128 and STA42 130 on MM-SME 126, along with AP6 132 and STA7 134. It will be noted that STAs are forming BSSs by connecting to an AP or PCP that provides centralized control to the BSS and the STAs connected to it. The WLAN can be extended by connecting different BSSs through devices that have multiple STAs and have a co-channel coordinated management operation to coordinate the interaction between the multiple STAs. The present disclosure can operate whether the STAs in the same device share the same PHY layer or each have a different PHY layer.

An MM-SME (multiple MAC station management entity) is used to manage the multiple STAs in one device and to coordinate the management of multiple MAC sublayers. STAs in the same device can operate (act) as a STA and connect to an AP of a specific BSS while other STAs can act as an AP and form another BSS. An example of that is shown in FIG. 13, where STA 31 116 in BSS 2 94 is connected to AP 21 110 and in the same device AP 32 118 is forming a BSS 3 96 with STA 41 128.

STAs in the same device can act as a STA and connect to an AP of a specific BSS while other STAs can act as a STA and connect to another AP from a different BSS. An example of this is also shown in FIG. 13, where STA 41 128 of BSS 3 96 is connected to AP 32 118 of BSS 3, while in the same device STA 42 130 in BSS 4 98 is connected to AP 5 132 of a different device and a different BSS.

STAs in the same device can act as a STA or AP/PCP and connect to another STA of a specific BSS in one band while other STAs can act as a STA or AP/PCP and connect to another STA from a different BSS in a different band. An example of that is shown in the figure, where AP21 110 in BSS 2 94 is connected on the directional mmW band to STA 31 116 and STA 61 122 and forming one BSS (BSS 2) while AP 22 112 is connected to STA 11 104 on the sub-6 GHz band and forming another BSS (BSS 1). The device in this case is considered a multi-band device, for example STA 11 104 and STA 12 106 are part of a multi-band device, and AP 21 110 and AP 22 112 are part of another multi-band device.

Wireless devices are connected in a mesh-like topology through the management of the MM-SME that connects different BSSs. In the example of FIG. 13 there are five BSSs formed by AP 21, AP 22, AP 32, AP 5 and AP 62. The five BSSs are connected through the MM-SME controlling these APs.

5. Multi-BSS Coordinated Discovery

A new STA needs to discovery other STAs that lie in its coverage area. For spectrum efficiency and to reduce network latency the present disclosure avoids the use of exhaustive beacon sweeping of the STAs in the network and uses an on-demand discovery assistance process.

A new STA reaches out to a STA that is discovered through either the sub-6 GHz band for example, or the mmW band, and asks for (requests) discovery assistance to discovery other STAs around it in its BSS or outside the discovered BSS.

The STA that received the discovery assistance request forwards the request to other STAs it is connected to and requests other STAs to assist the new STA for discovery.

STAs receiving this forwarded request are configured to forward the request to the MM-SME. The MM-SME propagates the request to other STAs in different BSSs other than the BSS of the STA from which the discovery assistance request was received. If the device has an AP that belongs to another BSS in this device, the MM-SME propagates the request to the AP. If the AP supports discovery assistance it responds to the MM-SME with a discovery assistance response including a status code indicating if the request is accepted or rejected and the details of the discovery assistance provided in case it is accepted. If the device has a STA that belongs to another BSS in this device, then the MM-SME propagates the request to the STA.

If the STA supports discovery assistance, it propagate the discovery assistance to the AP it is connected to and waits for the discovery assistance response. Once it receives the discovery assistance response from the AP, it forwards it to the MM-SME. If the device does not have other STAs, or has STAs that belongs to the same BSS, the MM-SME does not propagate the request. If the MM-SME received a response, it forwards this response to the STA that received the discovery assistance request.

Figure 14:
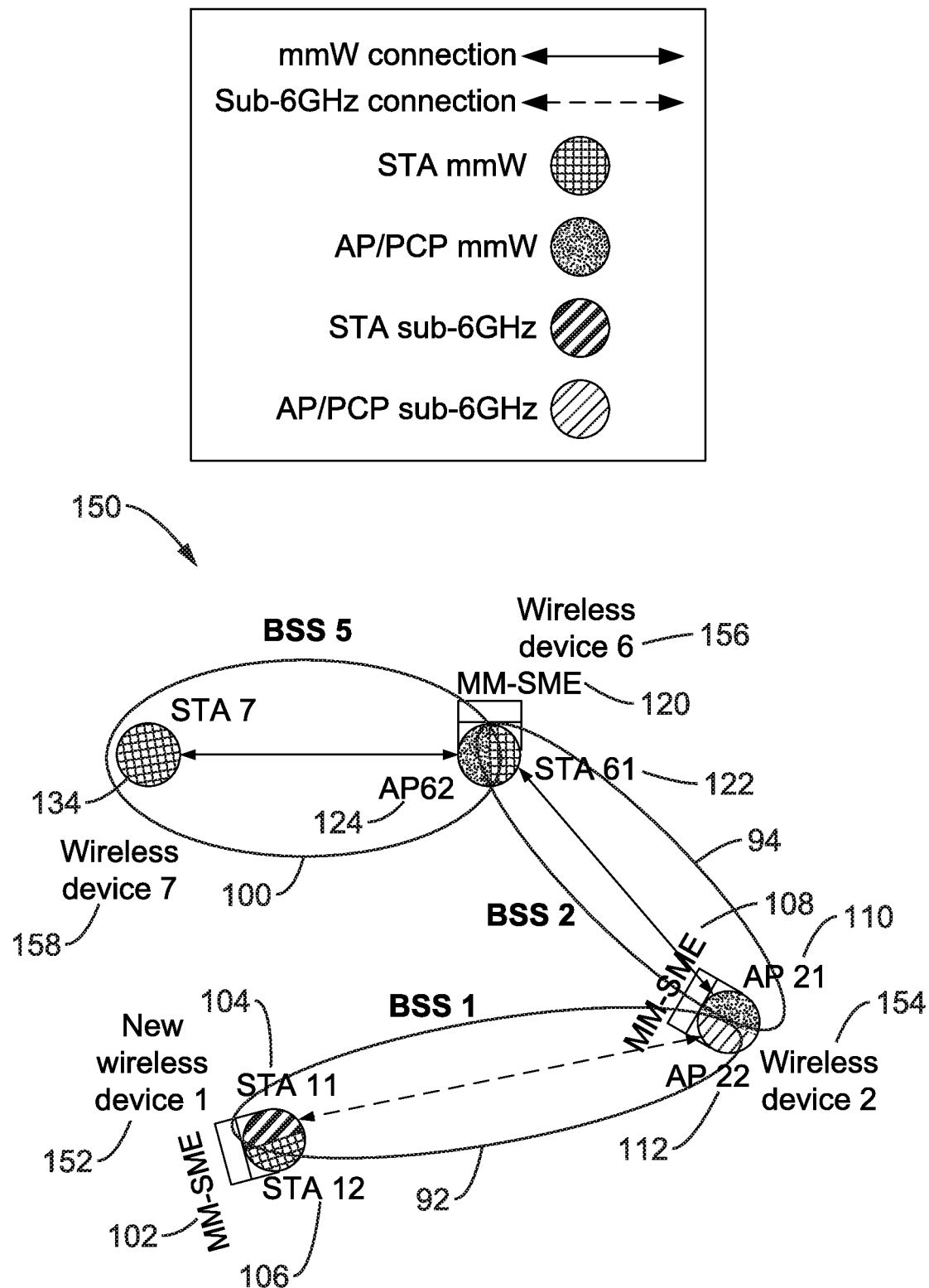
FIG. 14 is a signaling and directional beam diagram of an example topology in which discovery assistance is requested of two BSSs according to an embodiment of the present disclosure.

6. Discovery Assistance Request Forwarding to Neighbor BSS 6.1. Example 1: forwarding to another BSS AP FIG. 14 illustrates an example embodiment 150 showing the process of requesting discover assistance of two BSSs. In this example topology is shown multiple BSS, with BSS 1 92, BSS 2 94 and BSS 5 100. A number of AP/PCPs and STAs and their associated MM-SME are shown with STA11 104 and STA12 106 on MM-SME 102, AP21 110 and AP22 112 on MM-SME 108, STA61 122 and AP62 124 on MM-SME 120, along with STA7 134.

The new STA 152 in this example (new wireless device 1) WD 1 has multi-band capability and is equipped with two STAs. It includes STA 11 that is operating on sub-6 GHz band and STA 12 that is operating on the mmW band.

The new WD1 152 discovers WD 2 154 on the sub-6 GHz and connects with AP22 112 using the lower band. WD2 is a multi-band device, supporting both the mmW band and discovery assistance. WD2 announces these capabilities and features in the beacon broadcasted on the sub-6 GHz band. The new WD1 152 uses the lower band connection to send a discovery assistance request using the multi-band discovery assistance protocol described in the 802.11ay standard.

The new WD 1 152 sends a FST Setup Request frame with discovery assistance element attached to it and other elements to describe capabilities and modes of operation, for example DMG capabilities, TDD slot structure or TDD slot schedule element.

AP22 122 receives the discovery assistance request (FST setup request frame for example) and forwards the discovery assistance element to the MM-SME 108. A message is sent from AP 22 to the MM-SME containing the discovery assistance element and any other information received from new WD1 152. The MM-SME decides on the discovery assistance request and forwards the discovery assistance request to the AP on the mmW band (AP 21 110).

AP 21 110 propagates the discovery assistance request to other STAs in its BSS (BSS 2 94). AP 21 sends a discovery assistance request (Information request frame with discovery assistance element and the new STA DMG capability element attached to it) to STA 61 122. STA 61 receives the request and forwards it to its MM-SME 120 on wireless device 6 156. If WD6 156 supports discovery assistance and the request is accepted, the MM-SME 120 forward the discovery assistance request to the AP (AP 62 124). The message sent from MM-SME to AP 62 contains the discovery assistance element and any other information received with the discovery assistance request.

If AP 62 124 supports discovery assistance it shall respond to the DA request. If AP 62 accepted the discovery assistance request, it indicates that the DA request is accepted in its DA response. If AP 62 accepts the DA request, it indicates the time and period it is providing discovery assistance in the DA element attached to the DA response as well as its MAC address. AP 62 sends the MM-SME message with the DA element indicating acceptance to the DA request and its MAC address. The MM-SME forward this information to STA 61 122 in a DA response message, which should contain the DA element received from AP 62.

STA 61 122 sends AP 21 110 the discovery assistance response (information response frame with DA element for example). AP 21 receiving the DA response from AP 62 forwarded by STA 61, processes the information in the DA element and adds to it DA decision and timing information and prepares a new DA element. AP 21 110 forwards the new DA element to the MM-SME 108 by sending a message to the MM-SME containing the DA element. The MM-SME forwards the DA response to AP 22 112. AP 22 112 sends the response to the new WD 1 152 through the sub-6 GHz band, using FST setup response frame for example with the DA element attached to it.

AP 62 and AP 21 start sending the mmW beamforming signal as indicated in the DA element sent to the new STA and the new STA starts scanning for BF frames to discover neighbor STAs in case of passive scanning. In case of active scanning the new STA transmits discovery beacons, probe requests or other BF frames in the allocated times and AP 62 and AP 21 listen for the new STA frames at the allocated time.

Figure 15A:
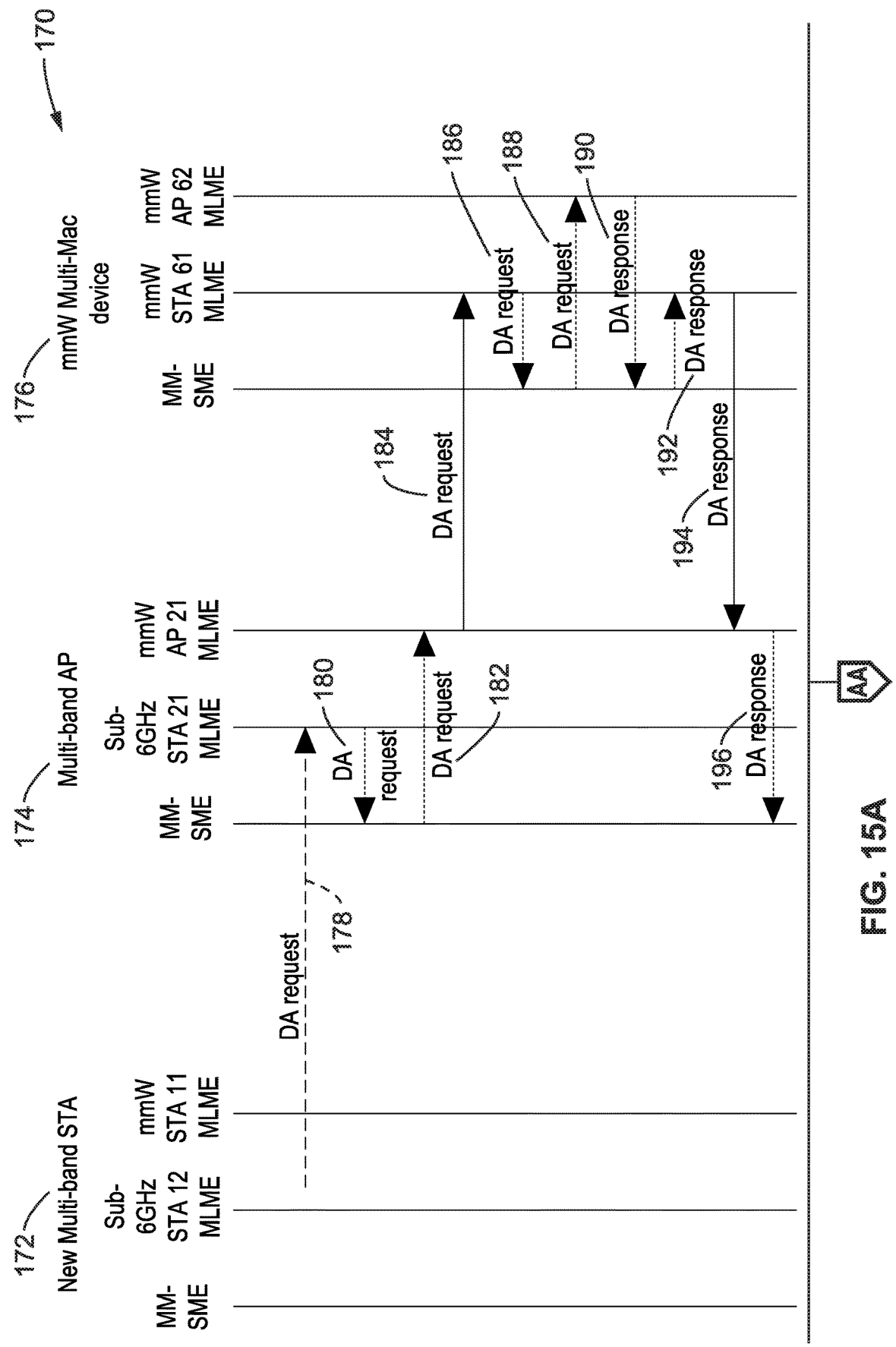
FIG. 15A and FIG. 15B is a communication interchange diagram showing requesting discover assistance of two BSSs according to an embodiment of the present disclosure.
Figure 15B:
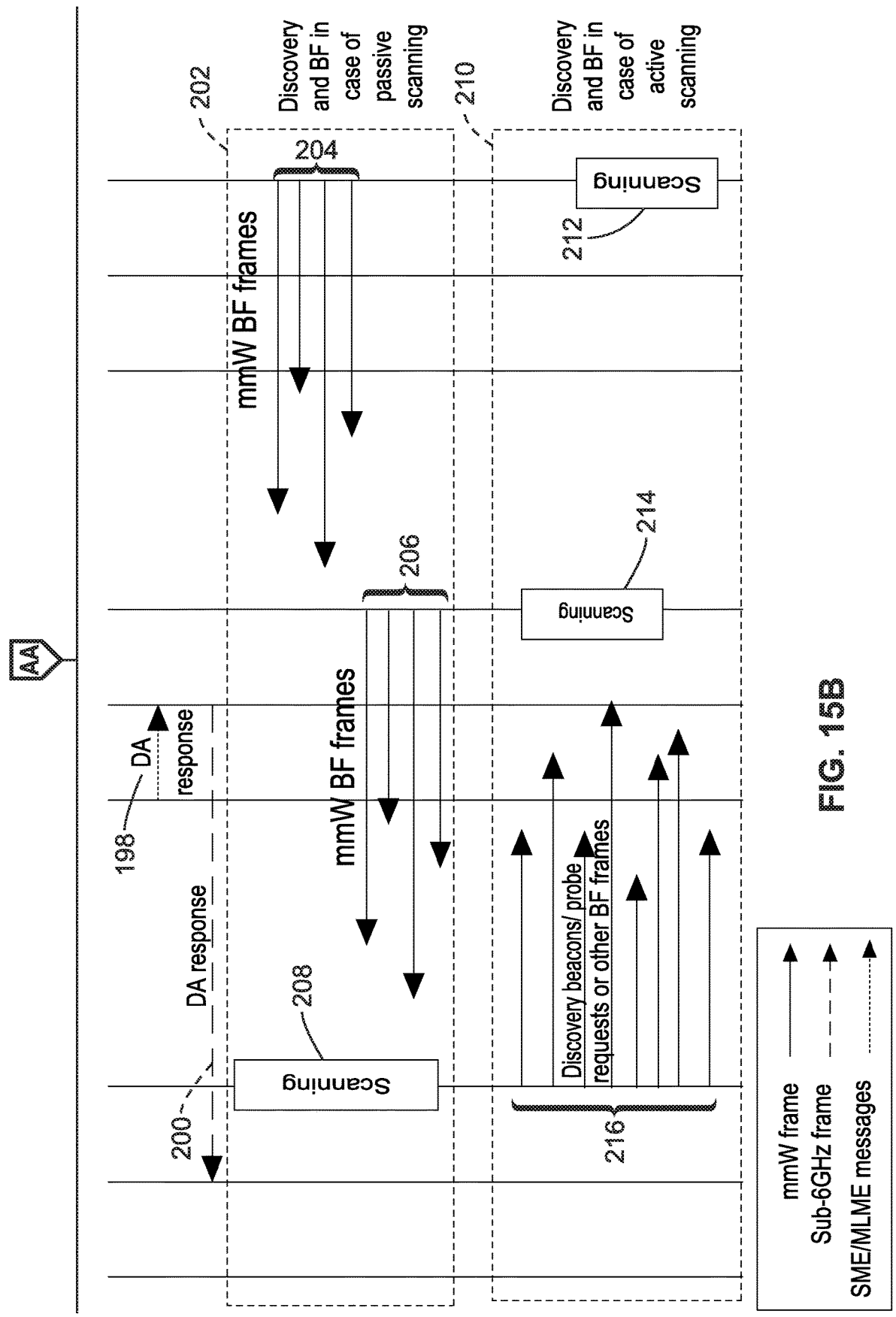

FIG. 15A and FIG. 15B illustrate an example embodiment 170 of message flow as discussed above. In FIG. 15A a new multi-band STA 172 is seen with MM-SME, sub-6 GHz STA 12 MLME and mmW STA 11 MLME, the multi-band AP 174 is seen with MM-SME, sub-6 GHz STA 21 MLME and mmW AP 21 MLME, while a mmW multi-MAC device 176 is shown with MM-SME, mmW STA 61 MLME and mmW AP 62 MLME. In this communication example a DA request 178 is sent by sub-6 GHz band from STA 12 to STA 21 MLME which forwards the DA request 180 to its MM-SME which sends a DA request 182 to the mmW AP 21. AP21 sends a DA request 184 to mmW STA 61, which sends DA requests 186 and 186. The mmW AP 62 responds with DA response 190 to the MM STE which generates a response 192 to STA 61 MLME. STA 61 MLME sends a DA response 194 to mmW AP 21 MLME, which generates a response 196 to its MM SME, which then responds with a DA response 198 as seen in FIG. 15B. Having received the response the sub-6 GHz STA 21 MLME sends a DA response 200 to sub-6 GHz STA 12 MLME. In section 202 discovery and BF is shown for the case of passive scanning with mmW BF frames 204, 206 being sent from mmW AP 62 MLME and mmW AP 21 MLME for which the mmW STA 11 MLME is scanning 208. Alternatively, section 210 depicts the case of discovery and BF for active scanning, with mmW STA 11 MLME sending 216 discovery beacons, probe requests, or other BF frames while both mmW AP21 MLME and mmW AP62 MLME are scanning 212, 214.

6.2. Example 2: Forwarding to Another BSS STA

Figure 16:
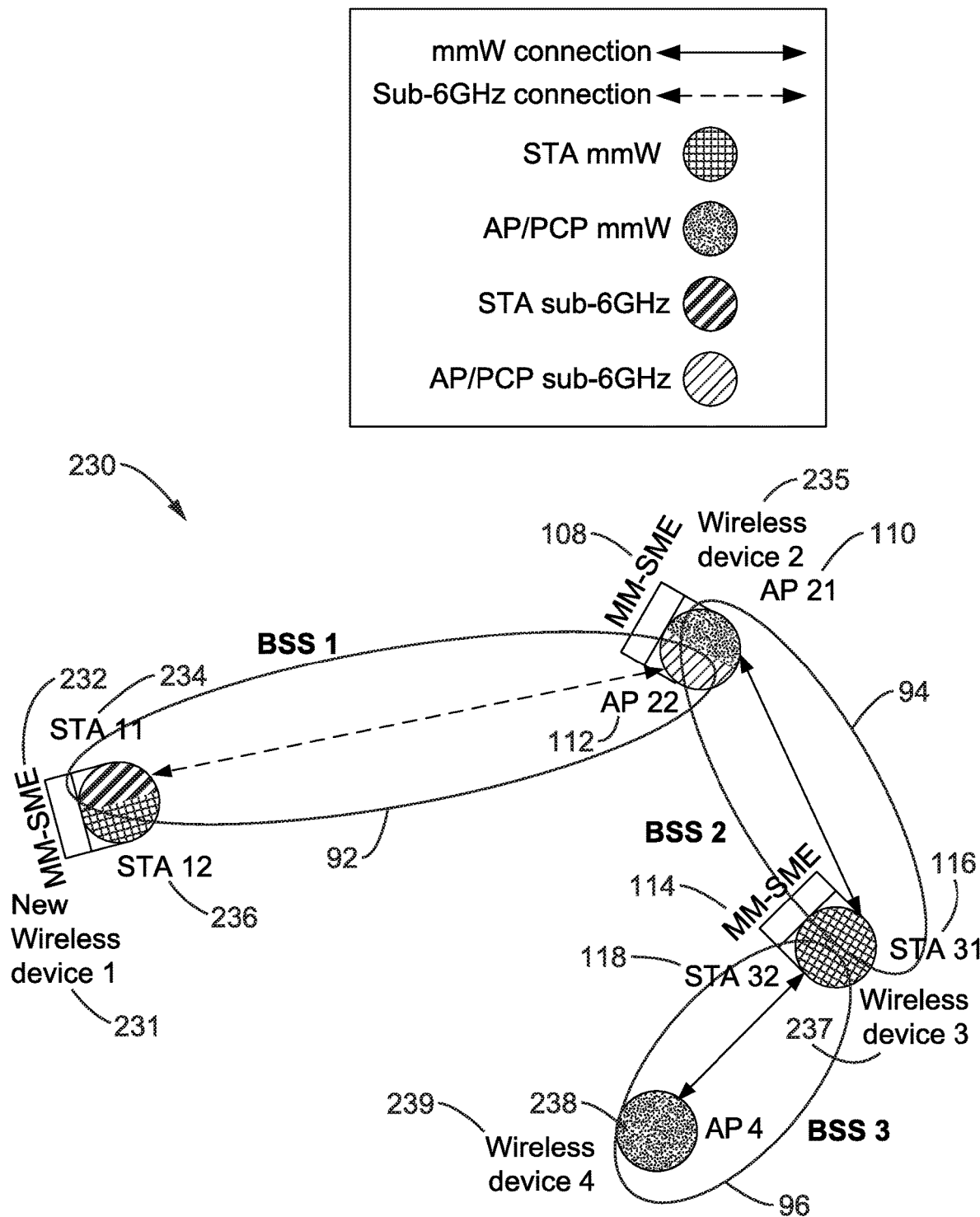
FIG. 16 is a signaling and directional beam diagram of an example topology in which a STA is requesting discovery assistance of two BSSs through a BSS STA according to an embodiment of the present disclosure.

FIG. 16 illustrates an example embodiment 230 showing a topology in which a STA is requesting discovery assistance of two BSSs through a BSS STA. In this figure is seen four wireless devices 231, 235, 237 and 239. These wireless devices are shown connecting in three different BSS, specifically BSS 1 92, BSS 2 94 and BSS 3 96. MM-SME with stations and APs are seen as MM-SME 108 with AP 21 110 and AP22, MM-SME 114 with STA 31 116 and STA 32 118, MM-SME 232 with STA 11 234 and STA 12 236.

New wireless device 1 231 (WD1) is shown in this example as being multi-band capable and equipped with two STAs, including STA 11 234 that is operating on the sub-6 GHz band and STA 12 236 that is operating on the mmW band. New WD1 231 discovers WD 2 235 on the sub-6 GHz band and connects with AP 22 112 using this lower band. WD2 is a multi-band device supporting both the mmW band and discovery assistance. WD2 announce these capabilities and features in the beacon broadcasted on the sub-6 GHz band. The new WD1 uses the lower band connection to send a discovery assistance request using the multi-band discovery assistance protocol, such as described in the 802.11ay standard.

New WD1 231 sends a FST Setup Request frame with discovery assistance element attached to it and other elements to describe capabilities and mode of operation, which by way of example and not limitation include DMG capabilities and the TDD slot structure or TDD slot schedule element.

AP 22 112 receives the discovery assistance request (FST setup request frame for example) and forwards the discovery assistance element to MM-SME 108. A message is sent from AP 22 to the MM-SME contains the discovery assistance element and any other information received from new WD1. The MM-SME decides on the discovery assistance request and forwards the discovery assistance request to the AP on the mmW band, which is AP 21 110.

AP 21 propagates the discovery assistance request to other STAs in its BSS. AP 21 sends a discovery assistance request (Information request frame with discovery assistance element and the new STA DMG capability element attached to it) to STA 31 116 of wireless device 3 (WD3) 237. STA 31 receives the request and forwards this to its MM-SME 114. If WD3 237 supports discovery assistance and the request is accepted, the MM-SME 114 forwards the discovery assistance request to STA 32 118. This message sent from the MM-SME to STA32 contains the discovery assistance element and any other information received with discovery assistance request.

STA 32 118 in BSS 3 96 also forwards the DA request to the AP or PCP of its BSS. Thus, in this example STA 32 sends a DA request (information request frame with DA element and the DMG capability of the new STA) to AP 4 238. AP 4 receives the DA request and if it supports discovery assistance, it responds to the DA request. If AP 4 accepts the discovery assistance request, it indicates that the DA request is accepted in the DA response. If AP 4 accepts the DA request, it indicates the time and period during which it is providing discovery assistance as communicated in the DA element attached to the DA response as well as its MAC address. AP 4 sends the DA response to STA 32, such as through an information response frame with the DA element attached to it. AP 4 adds its MAC address to the list of STAs providing DA in the DA element.

STA 32 118 receives the DA response from AP 4 238 and forwards the element to the MM-SME 114 through a message sent from STA 32 MLME to the MM-SME. The MM-SME forwards the element to STA 31 116 by sending a message including the element.

STA 31 116 sends a DA response (information response frame with the DA element) to AP 21 110. AP 21 upon receiving the response, processes the information in the DA element to which it adds a DA decision and timing information and prepares a new DA element. AP 21 forwards the new DA element to the MM-SME 108 by sending a message to the MM-SME containing the DA element. The MM-SME forward the DA response to AP 22 112. AP22 sends the response to new WD1 231 through the sub-6 GHz band (using FST setup response frame for example with the DA element attached to it) to STA 11 234.

AP 4 and AP 21 start sending the mmW beamforming signal as indicated in the DA element sent to the new STA and the new STA starts scanning for BF frames to discover neighbor STAs in case passive scanning is being performed. In the case of active scanning, the new STA transmits discovery beacons, probe requests or other BF frames in the allocated times and AP 4 and AP 21 listen for the new STA frames at the allocated time.

Figure 17A:
FIG. 17A and FIG. 17B is a communication interchange diagram showing a STA requesting discovery assistance of two BSSs through a BSS STA according to an embodiment of the present disclosure.
Figure 17B:
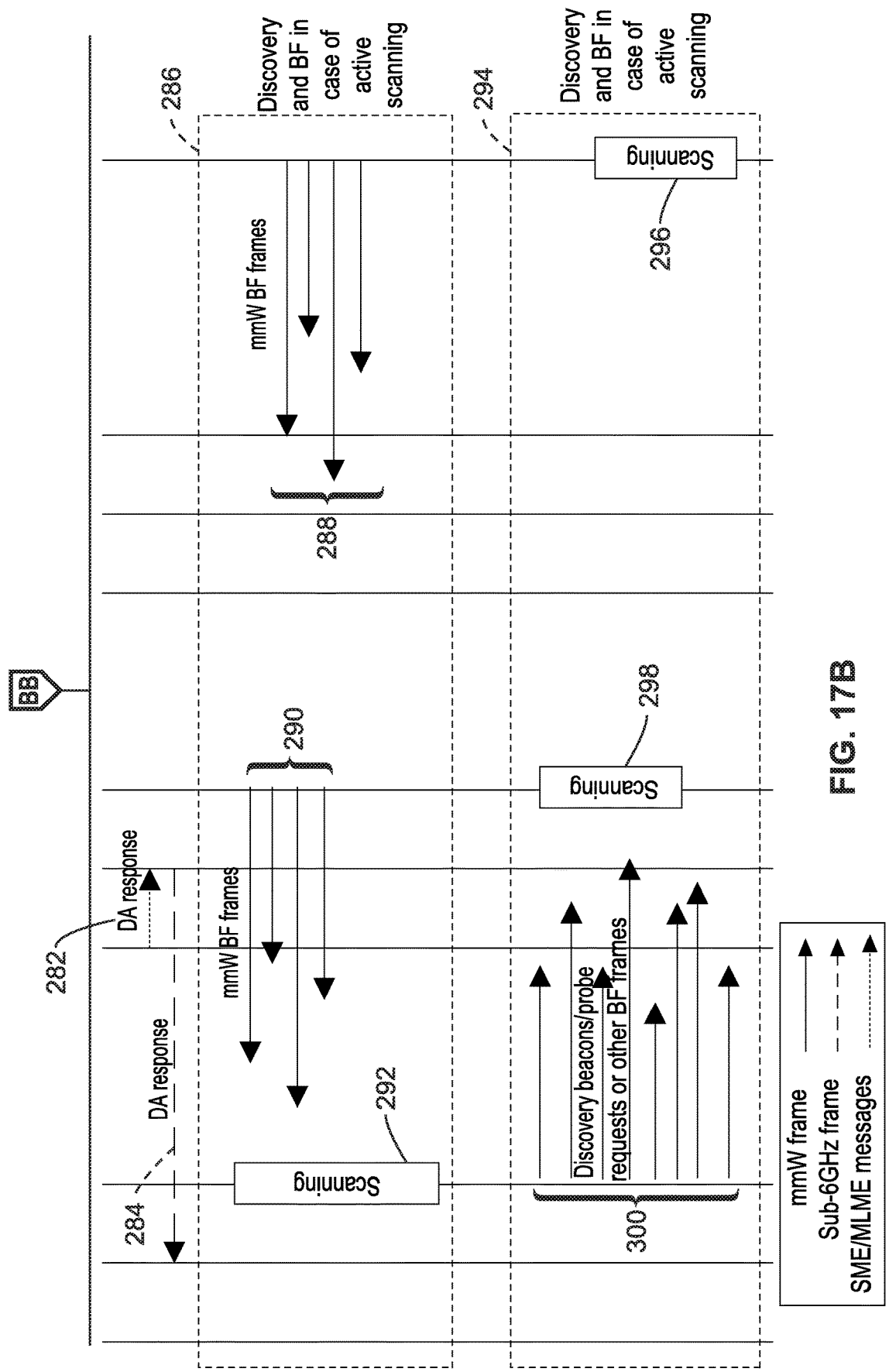

FIG. 17A and FIG. 17B illustrate an example embodiment 250 of message flows for the example shown in FIG. 16 as described above. In FIG. 17A the new multi-band STA 252 is seen with MM-SME, sub-6 GHz STA 12 MLME and mmW STA 11 MLME, the multi-band AP 254 is seen with MM-SME, sub-6 GHz STA 22 MLME and mmW AP 21 MLME, a mmW multi-MAC device 256 is shown with MM-SME, mmW STA 31 MLME and mmW STA 32 MLME, and a mmW AP 258. In this communication example a DA request 259 is sent by sub-6 GHz band from STA 12 to STA 22 MLME which forwards the DA request 260 to its MM-SME which sends a DA request 262 to the mmW AP 21. AP21 sends a DA request 264 to mmW STA 31 MLME, which sends a DA request 266 to its MM-SME, which sends a DA request 268 to mmW STA 32 MLME. This mmW STA 32 MLME then sends a DA request 270 to its mmW AP 258 which is mmW AP4 MLME. The mmW AP 258 responds with a DA response 272 to STA 32 MLME, which generates a response 274 to its MM-SME, which then responds with a DA response 276 to its mmW STA 31 MLME. The mmW STA 31 MLME sends a DA response 278 to the mmW AP21 MLME, which sends DA response 280 to its MM-SME, that sends a DA response 282 in FIG. 17B to sub-6 GHz STA 22 MLME that then then sends a DA response 284 to sub-6 GHz STA 12 MLME of new multi-band STA 252

In section 286 discovery and BF is shown for the case of active scanning with mmW BF frames 288, 290 being sent from AP 4 MLME of mmW AP 258 and from mmW AP 21 MLME of multi-band AP 254, for which the mmW STA 11 MLME is scanning 292. An alternative discovery with BF is shown in section 294 for passive scanning, with mmW STA 11 MLME sending 300 discovery beacons, probe requests, or other BF frames while both mmW AP21 MLME and mmW AP4 MLME are scanning 296, 298.

7. Receiving the DA Request

When the MM-SME receives a DA request it forwards this DA request to STAs it is managing which support the DA feature.

7.1. Receiving the DA Request on the sub-6GHz Band

A STA receiving a DA request on the sub-6 GHz band is configured to propagate this request to its MM-SME. In at least one embodiment, the DA request is part of a multi-band discovery assistance procedure and the request has the multi-band element attached to it for determining which band the DA is request on. The MM-SME forwards the request to the mmW band STA, as it is the mmW band which should provide DA to the new STA. If the mmW band STA decides to forward the request to other STAs in the network it can utilize an information request frame (or other frame) and add a DA element to it with request to assist the new STA. This request is propagated to all STAs connected to the AP. The AP on the mmW band, upon sending the DA request to other STAs, then resets a timer to respond to the new STA. If this timer expires and no response is received, the AP sends its own response to the new STA through the multi-band discovery assistance protocol.

7.2. Receiving the DA Request on the mmW Band

Figure 18:
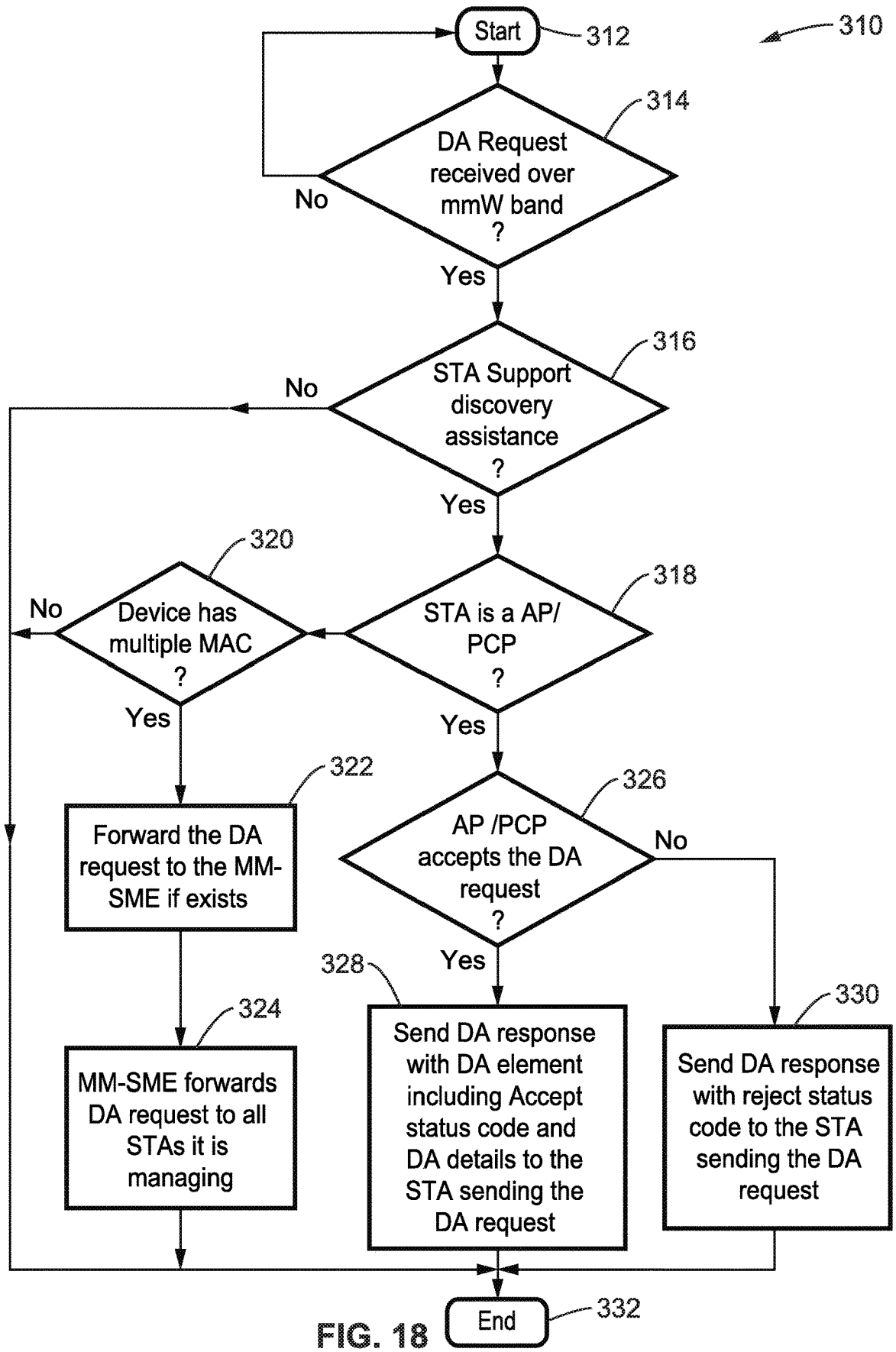
FIG. 18 is a flow diagram of a STA receiving a DA request over the mmW band and furthering that request according to an embodiment of the present disclosure.

FIG. 18 illustrates an example embodiment 310 of a STA receiving a DA request over the mmW band and furthering that request so that an AP can assist the new STA in discovering the network. Processing commences 312 with a DA request received 314 over the mmW band. A check is then made 316 if this receiving station supports the DA feature. If the STA does not support the feature it ignores the received request with processing reaching the end 332 of the process. Otherwise a check is made if this STA is an AP or a PCP. If this STA is not an AP or PCP, then a check is made at block 320 to determine if the device has multiple MACs. If the device does not have multiple MACs the STA ignores the request, reaching end block 332. Otherwise, the STA supporting multiple MAC forwards 322 DA request to the MM-SME, which then forwards 324 the DA request to all STAs it is managing, before ending 332 this process.

If it determined at block 318 that the STA is an AP or PCP, then a check is made 326 if the AP/PCP will accept the DA request. If the AP decides to accept the DA request, it prepares a DA element with the discovery assistance information it will provide (time to start the DA, period of time the DA is extending and the MAC address of the STA providing the DA). The AP/PCP use the DMG capability of the new STA attached to the DA request to decide on the discovery assistance and calculate the time to start and the period of the discovery assistance. The AP/PCP sends 328 the DA response with the DA element to the STA it received the DA request from, and then ends 332.

Otherwise, if the AP decides to reject the DA request, it sends 330 a DA response frame to the STA it received DA request from with a DA element containing a DA rejection in the status code of the DA request, and then ends 332.

7.3. Receiving the DA Request from the MM-SME

Figure 19:
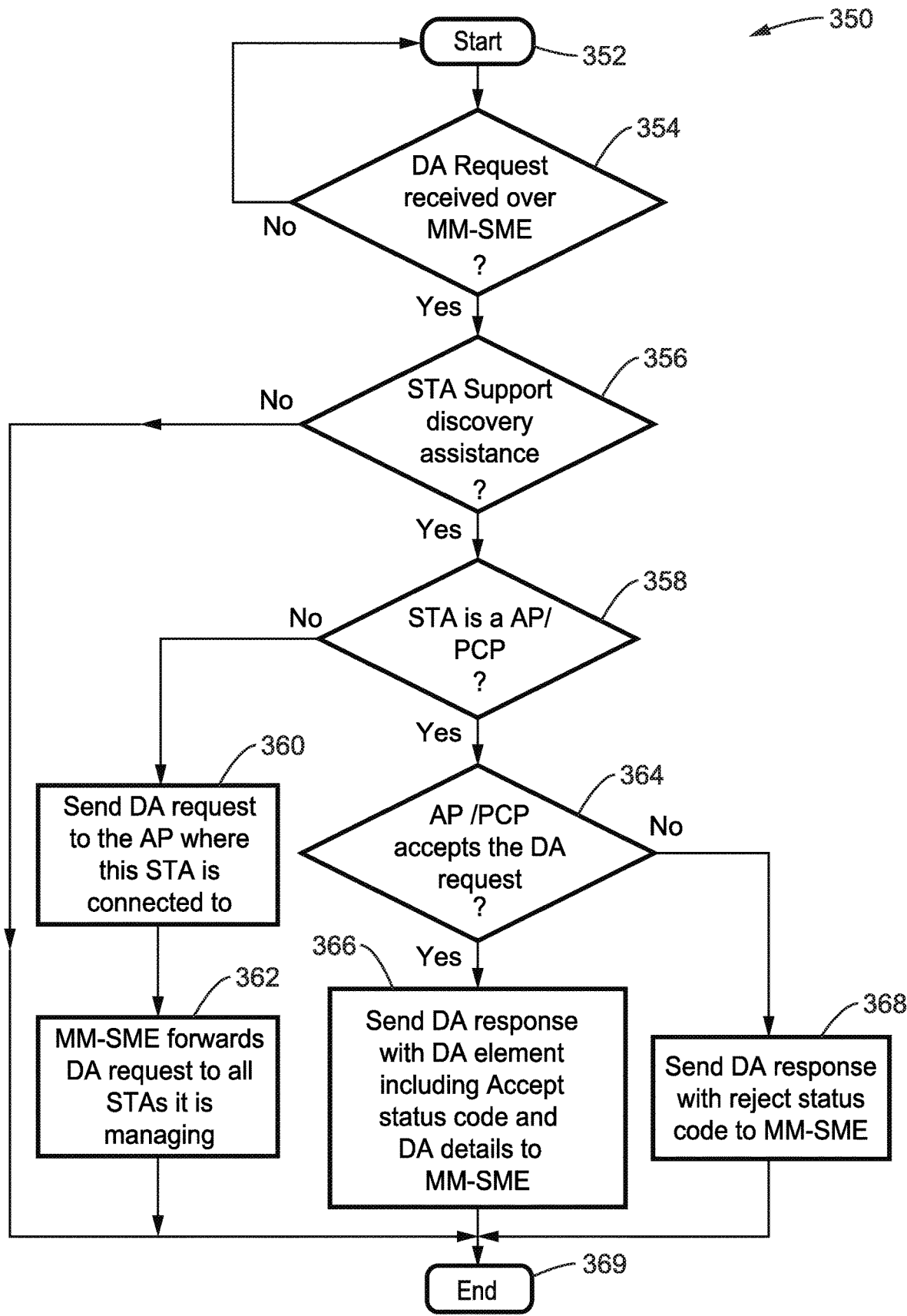
FIG. 19 is a flow diagram of a STA receiving a DA request from the MM-SME of its device according to an embodiment of the present disclosure.

FIG. 19 illustrates an example embodiment 350 of a STA receiving a DA request from the MM-SME of its device. Processing starts 352 with the DA received over MM SME 354 with a check made 356 if the STA supports the DA feature. If the STA does not support the DA feature, then the DA is ignored with execution reaching end 369. However, if the STA supports discovery assistance then a check 358 determines if this STA is an AP or PCP.

If the STA supports the discovery assistance feature, but is not an AP or PCP, the block 360 is reached and the STA forwards the DA request to the AP/PCP to which the STA is connected in its BSS. Then the MM-SME forwards 362 the DA request to all STAs it is managing that support DA feature, before processing ends 369.

Otherwise, if it is determined at block 358 that the STA is an AP/PCP then a check is made at block 364 if the AP/PCP will accept the DA request. If the AP decides to accept the DA request, then at block 366 a DA element is prepared with discovery assistance information (e.g., time to start the DA, period of time the DA is extending and the MAC address of the STA providing the DA), before processing ends 369. The AP/PCP uses the DMG capability of the new STA attached to the DA request to decide on the discovery assistance and calculate the time to start and the period of the discovery assistance. The AP/PCP sends the DA response with the DA element to the MM-SME.

Otherwise, if at block 364 it is determined that the AP will reject the DA request, then at block 368 a DA response frame is sent to the MM-SME with a DA element containing a rejection in the status code of the DA request, before processing ends 369.

8. Receiving a DA Response 8.1. Multi-band Capable Device Offering Discovery Assistance The AP running the multi-band discovery assistance process checks the state of the response timer it reset upon forwarding the DA request to other STAs in its BSS. If the timer expires and no response is received, the AP should continue the multi-band discovery assistance protocol and send a response to the new STA. If one or more responses are received, the AP processes these responses and sends one response to the new STA.

8.2. New STA Receiving DA Response

The new STA receive a DA response from the multi-band AP with DMG discovery assistance element containing the details of the offered DA campaign. The response includes: (a) Discovery assistance status code (accepted or rejected); (b) Discovery assistance type: (b)(i) scheduled beamforming through allocations sent through the extended schedule element, or (b)(ii) Triggered beamforming campaign with campaign details specified in: (b)(ii)(A) Beamforming Start TSF, (b)(ii)(B) Discovery Assistance Window Length, (b)(ii)(C) Number of Discovery Assistance Windows, and (b)(ii)(D) Discovery Assistance Window Period; (c) Type of scanning the new STA is performing (Active/Passive Scanning Indication); (d) Dwelling time to change the new STA receive sector antenna; (e) Number of STAs providing discovery assistance (Number of STAs Providing Discovery Assistance); and (f) MAC address of each STA providing discovery assistance.

Figure 20A:
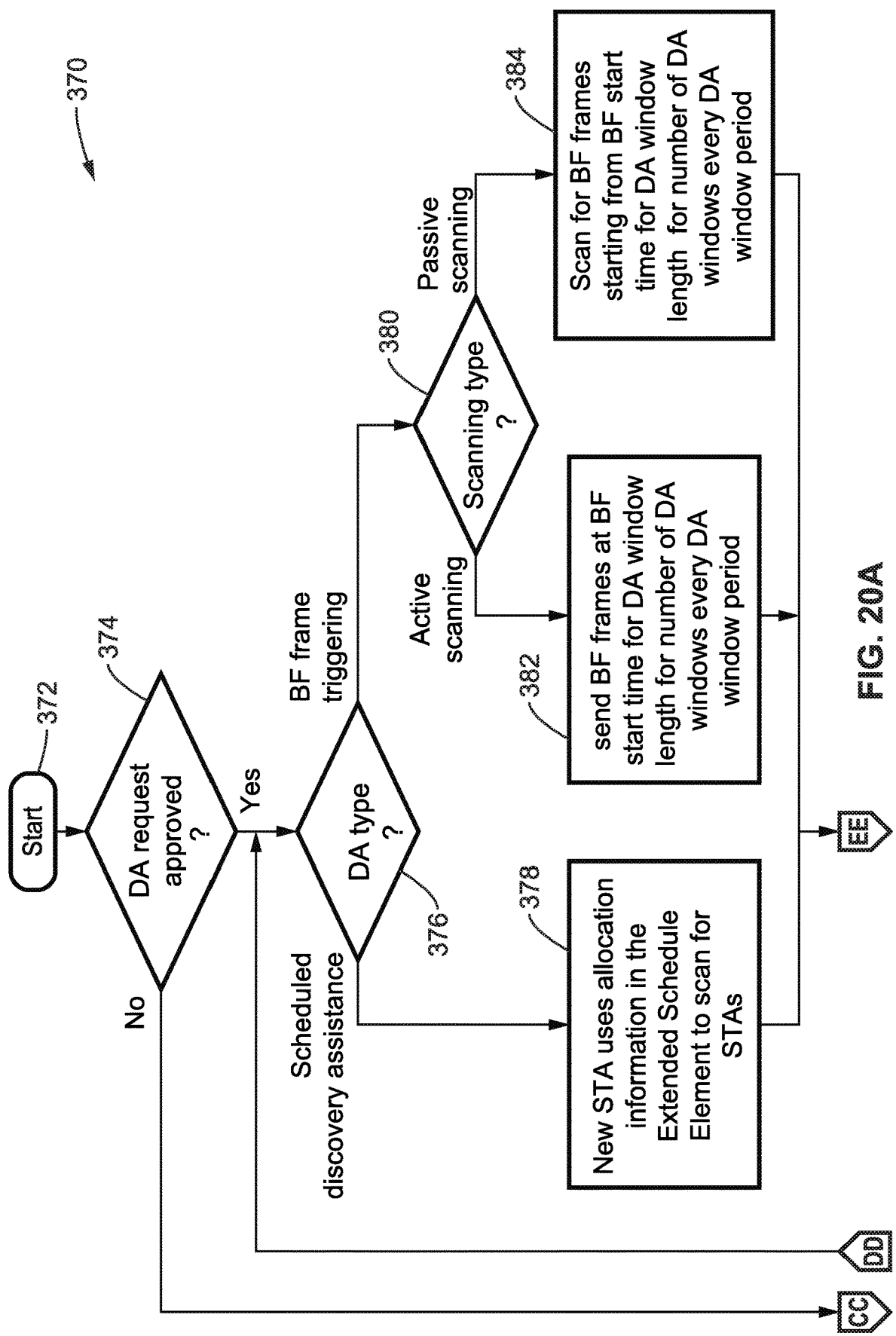

FIG. 20A and FIG. 20B illustrate an example embodiment 370 of a new STA receiving DA response and starting the DA campaign scanning. Processing starts 372 in FIG. 20A and a determination made 374 on whether to approve the DA request. If the DA request it not approved then this processing ends 394 in FIG. 20B. Otherwise, a check is made 376 on the DA type. If the DA types is scheduled discovery assistance, then at block 378 the new STA uses allocation information in the extended schedule element to scan for STAs, before reaching block 386 in FIG. 20B. If the DA type is BF frame triggering, then a check is made 380 on whether active or passive scanning is to be performed. If active scanning is being performed then block 382 is reached with the STA sending BF frames at the BF start time for DA window length for the number of DA windows in every DA window period, before reaching block 386 of FIG. 20B. Otherwise, if passive scanning is being performed then block 384 is reached with the STA scanning for BF frames starting from BF start time for DA window length for the number of DA windows every DA window period, before reaching block 386.

At block 386 a check is made of the neighbor station is discovered. If the neighbor was not discovered, then a check is made at block 392 to determine if the scanning time has expired. If scanning time has expired, then the process ends 394, otherwise execution returns to block 376 in FIG. 20A to check DA type.

If the neighbor station is discovered at block 386, then at block 388 a check is made to determine if the discovered STA MAC address is listed in the DA element. If it is not listed then a check is made at block 392 to determine if the scanning time has expired. If scanning time has expired, then the process ends 394, otherwise execution returns to block 376 to check DA type.

Figure 21:
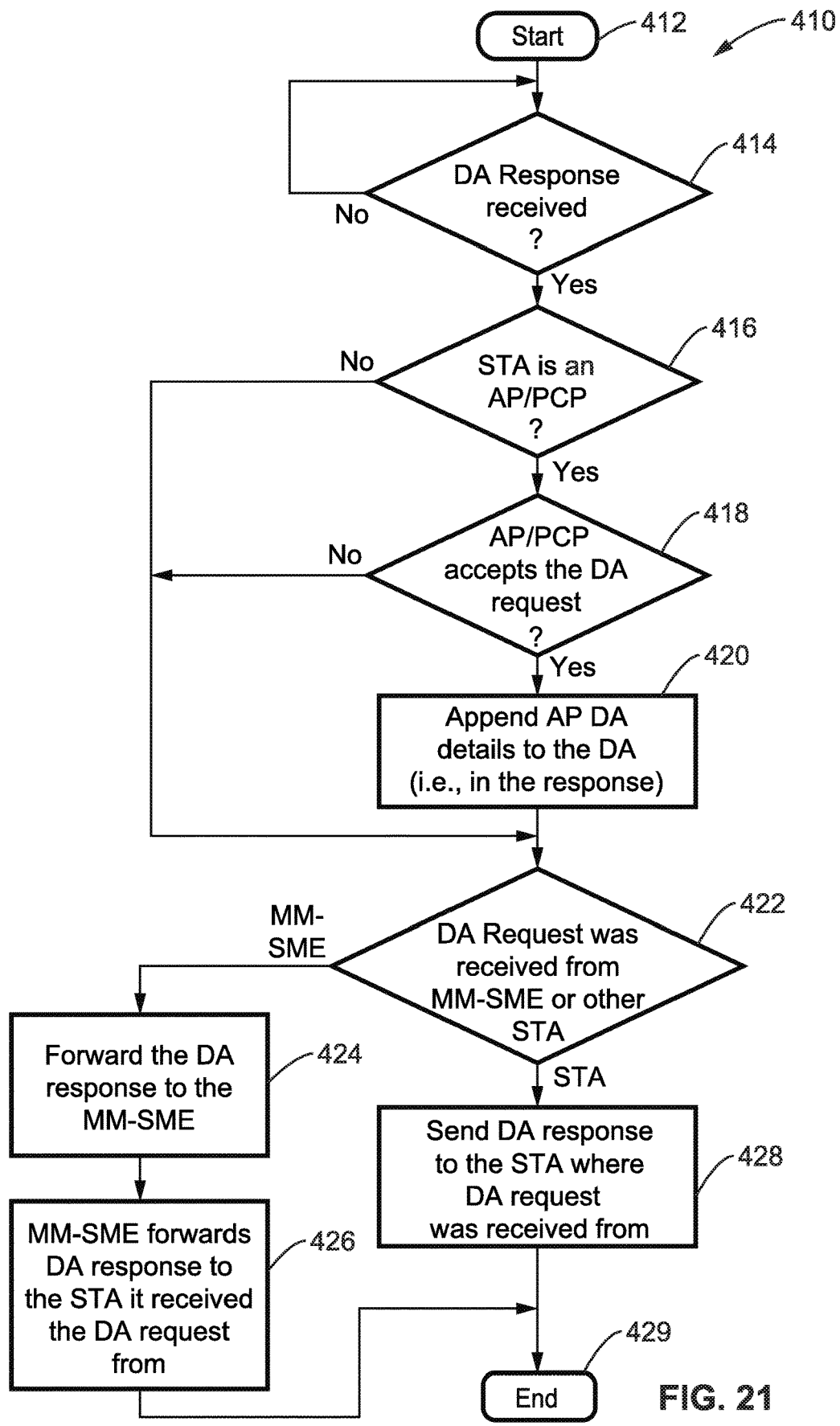
FIG. 21 is a flow diagram of other STA operation when receiving a DA responses according to an embodiment of the present disclosure.

If it is determined at block 388 that the MAC address of the discovered STA is listed, then at block 390 the station considers connecting to the discovery STA, and again reaches the check at block 392. It should be noted that the STA might favor some APs versus others to connect to, since some APs provide special services or support features the STA is interested in. Once the STA discover one of the APs it determine whether it will connect to it or not and keep looking for other STAs 8.3. STAs Receiving the Propagated DA Requests FIG. 21 illustrates an example embodiment 410 of the operation on other STAs when receiving DA responses. If the STA receiving a DA response is an AP or PCP and accepted the DA request it appends the DA response to the DA element in the DA response received. The AP performs an update including the following information: (a) the start time of discovery assistance as the earliest time of the AP discovery assistance start time and the start time in the DA element; (b) the discovery assistance window length set to be the time from the updated start time until the AP and the DA reporting of the DA element is concluded; (c) adding the MAC address of the AP to the list of the APs providing DA.

The STA forwards the DA response to the entity it previously received the DA request from. If this entity was a MM-SME, then the AP forwards the DA response to the MM-SME, which in return forwards it to the STA it received the DA request from. If the original DA request was received from a STA, then the response is forwarded to that STA.

In particular FIG. 21 shows the process starting 412 and reaching block 416 when a DA response is received 414. The check at block 416 determines if the STA is an AP/PCP. If it is not an AP/PCP, then execution branches past block 420 to the check at block 422. Otherwise, a check is made at block 418 if the AP/PCP will accept the DA request. If the AP/PCP will not accept the discovery assistance (DA) request, then execution jumps to block 422. Otherwise, if the STA is an AP/PCP and accepts the DA request, then at block 420 information about the AP are appended to the DA response.

At block 422 a check is made if the DA request was received from MM-SME or from another STA. If the DA request was from the MM-SME of the same device, then at block 424 the DA is forwarded to the MM-SME, and at block 426 the MM-SME forwards the DA response to the STA it received the DA request from, before reaching the end 429 of this process. Otherwise, if the DA request was received from another device, then at block 428 the DA response is sent to the STA from which the DA request was received, before ending 429 the process.

9. Allocating Resources for Discovery Beamforming

A multi-band capable device offering discovery assistance and receiving discovery assistance requests tries to reach out to other STAs in its BSS to assist in the new STA discovery campaign by propagating the DA request. The assistance is requested from a neighboring BSS that is connected to the BSS where the multi-band device is part of. The STAs receiving the DA request can assist if it has other BSS operated in this device and willing to offer discovery assistance to the new STA. The STAs receiving the DA request forwards the request to the other BSS STA in its device and waits for a response for the DA request. Once the response is received it forwards this response to the AP of the multi-band capable device providing discovery assistance to the new STA.

An AP of a BSS decides to accept or reject the DA request. If the DA request is accepted, the AP indicates in the response and adds the DA campaign details in the response. This information includes: (a) Start time of the DA campaign provided by this AP; (b) Time the DA is active for the new STA (discovery assistance window length); (c) Number of discovery assistance windows offered; (d) Period between discovery assistance windows; and (e) MAC address of the STA providing discovery assistance.

The multi-band capable device collects all responses from other STAs in the BSS and forwards the response to the new STA. The allocation of the discovery assistance can be through either: (a) sending a start time for the campaign and the window length where other STAs are actively sending BF frames to the new STA (total discovery assistance window length); or (b) sending an extending schedule element with all allocations of STAs providing discovery assistance to the new STA.

9.1. Active and Passive Scanning

The multi-band AP, when receiving and accepting a DA request from a new STA. determines (decides) on the type of scanning for the new node, such as either active scanning or passive scanning. When a DA request is sent to other STAs in the BSS of the multi-band AP BSS, the multi-band AP sends the request and indicates the type of scanning the new STA is going to perform. The other STAs receiving this request decide based on this for accepting or rejecting the request and allocating beamforming resources accordingly. Once the multi-band AP receives the responses from the other STAs that have received the DA requests, it sends the new STA a DA response with all allocation information and the type of scanning the new STA is performing.

9.2. Beamforming Allocation Example

Figure 22:
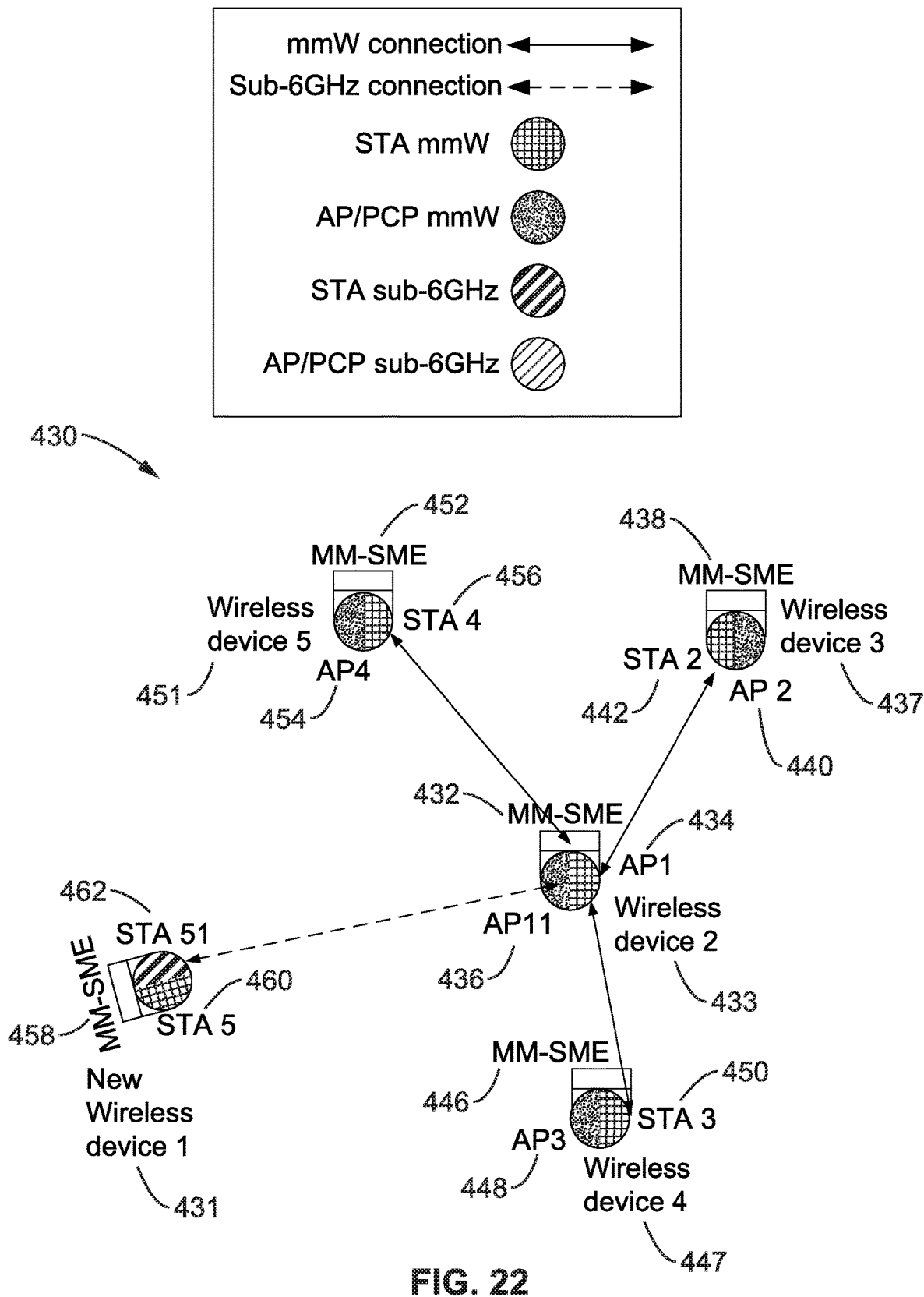
FIG. 22 is a signaling and directional beam diagram of a new multi-band wireless device having an STA operating on the mmW band and a STA in the same device operating on the sub-6 GHz band according to an embodiment of the present disclosure.

FIG. 22 illustrates an example embodiment 430 of a new multi-band wireless device (WD1) 431 operating in the network. By way of example and not limitation, the network topology depicts wireless devices WD1 431, WD2 433, WD3 437, WD4 447, and WD5 451. The MM-SME and associated stations include: new station WD1: MM-SME 458 with STA5 460 and STA 51 462, WD2: MM-SME 432 with AP1 434 and AP11 436, WD3: MM-SME 438 with AP2 440 and STA2 442, WD4: MM-SME 446 with AP3 448 and STA3 450, and WD5: MM-SME 452 with AP4 454 and STA4 456.

The figure depicts the new multi-band wireless device 431 containing STA 5 460 operating on the mmW band and STA 51 462 on the same device operating on the sub-6 GHz band. This new wireless device uses the multi-band discovery assistance protocol described in 802.11ay standard to request discovery assistance from AP1 434. Upon receipt by AP1 of the DA request from STA 51 (FST Setup request frame with DA element and DMG capability element), AP1 sends a DA request to STA 2 442, STA 3 450 and STA 4 456 (Information request frame with DA element and DMG capabilities element of the new STA), which are each mmW stations. The request is received and processed at these wireless devices which each send back a DA response (e.g., an information response frames containing a DA element). The DA element received from each of these STAs have the information of the scheduled DA provided by each AP (AP 2, AP 3 and AP 4).

Figure 23:
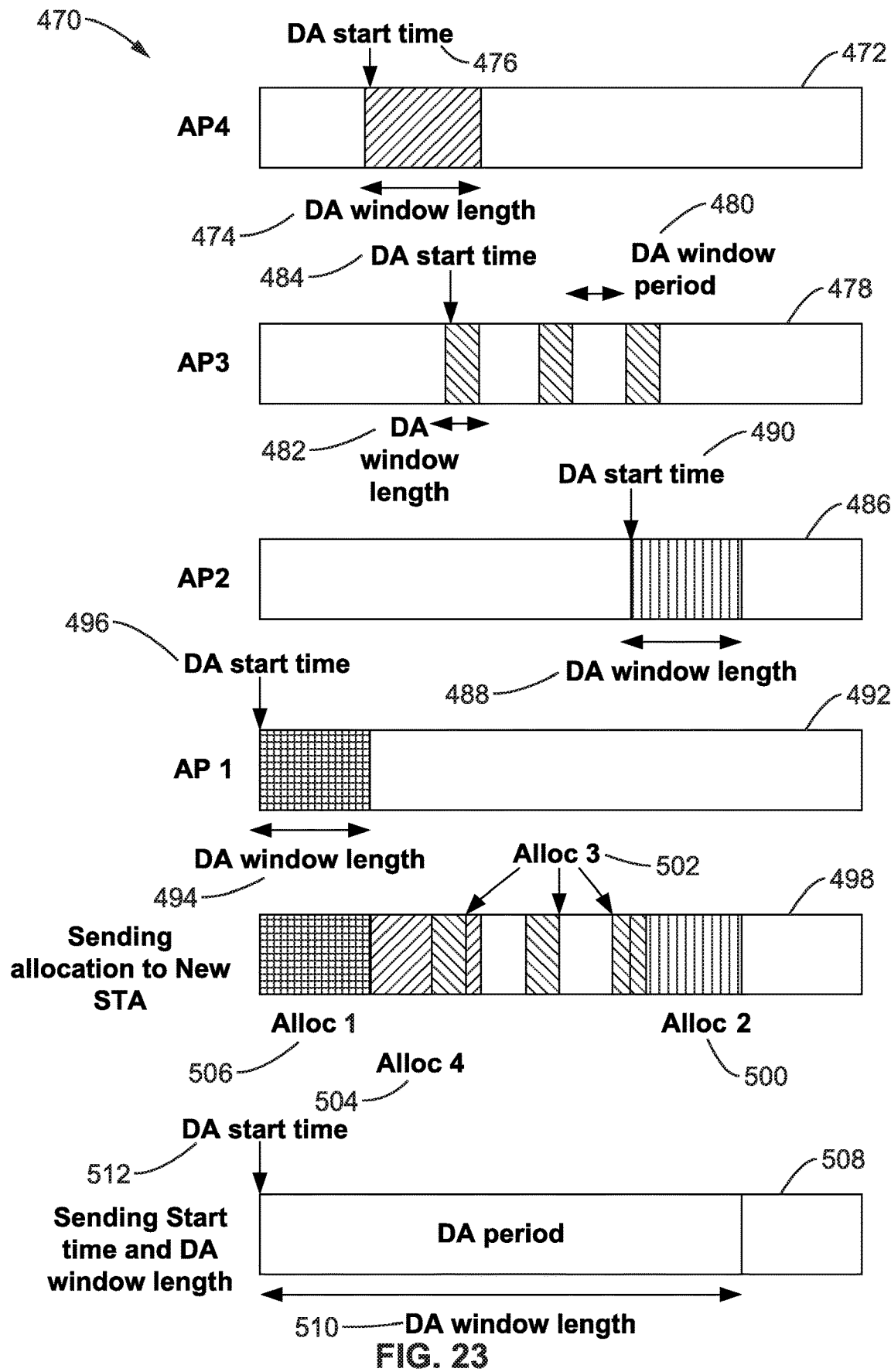
FIG. 23 are communications allocation diagrams for AP/PCPs as found in one example utilized according to an embodiment of the present disclosure.

FIG. 23 illustrates an example embodiment 470, based on the topology of FIG. 22, shows allocated resources for the discovery assistance (DA) campaign for the APs. Allocations in AP4 472 show a window length 474 and start time 476. Allocations in AP3 478 show a DA window period 480 between multiple windows having a DA window length 482 and start time 484. Allocations in AP2 486 show a window length 488 and start time 490. This information is relayed to AP1 as described in previous sections before the DA response is made containing the DA element.

AP1 processes the DA information from AP2, AP3 and AP4 and its own DA information 492 with DA window length 494 and start time 496.

9.2.1. Example Methods of Sending DA Information

AP1 having collected all this discovery information can pass it on to the new stations in a number of ways. By way of example and not limitation, AP1 can send the new STA this discovery assistance information in two ways.

9.2.1.1 Forward scheduled allocations through the Extended Schedule Element A first way is shown by allocations 498 in which AP1 adds the AP2 allocations 500, AP3 allocations 502, AP4 allocations 504 received from these APs to its own allocation 506 to the extended schedule element and forwards the extended schedule element to the new STA along with the DA element in the DA response (e.g., using the FST setup response frame).

In order to do so each allocation field in the extended schedule element reflects one discovery assistance response. (A) For each allocation field the BF control Subfield in the subfield in the allocation field in the Extended Schedule element sets beamforming details. (B) For each allocation field the source AID and the destination AID subfields in the allocation field in the Extended Schedule element are filled with the new STA temporary AID, the broadcast AID for the AP outside the BSS or the AP (AP1) AID for AP1 DA allocation depending on the allocation. The allocation start time in the allocation field in the extended schedule element represents the start time of the DA for each allocation. The AP starts the DA at that time and the new STA starts scanning for the DA beamforming frames at that time. (C) For each allocation field the discovery assistance window length of each DA period represents one allocation block period and its value sets the Allocation Block Duration subfield in the allocation field in the Extended Schedule element. The AP provide DA for the duration of the allocation block duration and the new STA is scanning for the DA beamforming frames for the allocation block duration from the Allocation Start time.

9.2.1.2 Forward the start time and the duration of the discovery assistance campaign In this second way 508, the AP sends the start time 512 of the DA campaign and the duration 510 of the whole DA assistance campaign. The multi-band AP connected to the new STA calculates the start time of the DA campaign to be the earliest time any AP will start transmitting discovery assistance frames (beacons or beamforming frames) and the DA window length period is the period of time after the DA campaign start time where at least one AP is providing DA to the new STA. The new STA scans for DA beamforming frames starting from the start time until the end of the DA window length period. This information is relayed to the new STA in the DA element alongside with the DA response frame (e.g., FST setup response frame).

10. Frame Formats

10.1 Discovery Assistance Information Element

FIG. 24 illustrates an example embodiment 530 of a Discovery Assistance (AD) information element (IE) contains all information needed to trigger the beamforming process. The AD IE contains the following fields. The Element ID, ID Extension and Length fields define the ID of the element and its length. The discovery assistance control field controls aspects of the discovery process and is described below regarding FIG. 25.

The Beamforming Start TSF represents the time over which the discovery assistance will start. This can represent the start of the DMG beacon sweep, the TDD SP beamforming or the expected time for the new STA to start active scanning. The value can be the lower 4 octets of the TSF of the DMG BSS at the time the beamforming frames transmission start.

The Discovery Assistance Window Length indicates the time in Time Units that the discovered STA is offering Discovery assistance. During this time the discovered STA is sending beamforming beacons or frames to the new STA or listening to the new STA for beamforming frames or probes.

The Number of Discovery Assistance Windows subfield contains the number of times the discovery assistance window is repeated. The STA offering discovery assistance provides discovery assistance for multiple blocks of Discovery Assistance Window Length equal to the Number of Discovery Assistance Windows. The new STA is expecting discovery assistance to be repeated for Number of Discovery Assistance Windows.

The Discovery Assistance Window Period subfield contains the time, in microseconds, between the start of two consecutive discovery assistance windows. The Discovery Assistance Window Period subfield is reserved when the Number of Blocks subfield is set to 1. The STA offering discovery assistance provides DA and the new STA is expecting DA in another period of discovery assistance after Discovery Assistance Window Period for Number of Discovery Assistance Windows.

The Dwelling Time field indicates the recommended time for the new STA to sweep the received antenna pattern in scanning for beamforming or discovery signal in microseconds.

Temporary AID contains a value assigned by the BSS STA to the new STA to represent a temporary AID for the new STA. The new STA uses this value to identify scheduled periods by the BSS STA to the new STA in case the extended schedule element is provided.

The Number of STAs Providing Discovery Assistance field indicates the number, N, of MAC Addresses for STA fields following it. This field is filled by an AP to indicate the number of STAs MAC addresses providing DA assistance and whose MAC address is given in the following fields. Each MAC Address of STA field contains the MAC address of a STA that is providing discovery assistance. The following fields indicate the MAC addresses of these STAs (e.g., MAC address of STA1 through the MAC address of STA N). The AP connected to the new STA when receiving the DA element from other STAs extracts this information and adds these other MAC addresses of STAs providing DA and the MAC address of itself and sends it to the new STA in a DA element. The new STA uses this information to identify potential STAs to beamform with if it discovered its frame.

Figure 25:
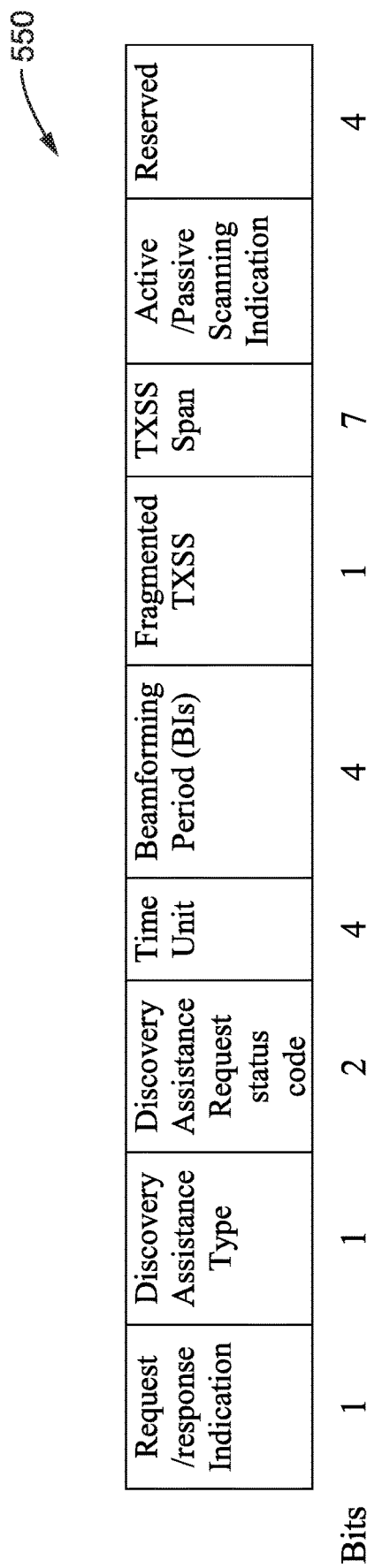
FIG. 25 is a data field diagram of a subfields within the discovery assistance control field shown in FIG. 24 according to an embodiment of the present disclosure.

FIG. 25 illustrates an example embodiment 550 the subfields within the discovery assistance control field shown in FIG. 24. The discovery assistance control field has the following subfields.

The Request/Response indication subfield is utilized to inform the receiving node (STA) whether the frame containing this element represents a request for discovery assistance (request element) or a response to a discovery assistance request that is sent from the receiving node (response element). If this field is set to a request, the receiving node triggers the discovery assistance protocol upon receiving this element. If the field is set to response, the receiving node extracts the response information to receive discovery assistance from the transmitting node.

The Discovery Assistance Type subfield indicates the type of discovery assistance if it is through a scheduled beamforming frame transmission or through triggered beamforming. This subfield represents a request if the subfield is in a request element and represents a response if the subfield is in a response element. When the subfield is set to triggered beamforming, the discovery assistance is performed through triggering the beamforming signal at a specified time (Beamforming Start TSF); this can be in the shape of beacon sweeping or TDD-beamforming. When the subfield is set to scheduled beamforming, the discovery assistance is scheduled in the attached extended schedule element.

The Discovery Assistant Request status code subfield specifies the response of the discovery assistant request. The possible values of the Discovery Assistant Request status code field are indicated below, while other status codes may be defined to add extra communication between the peer STAs.

Value 00: Reject a discovery assistance request on the band defined by the Band ID, operating class, channel number and BSSID, or other reason. The STA receiving this element will have to abort the discovery assistance procedure and optionally restart it again.

Value 01: Reject a discovery assistance request on the band defined by the Band ID, operating class, channel number and BSSID, for example based on the reason of unauthorized access. The STA receiving this element will have to abort the discovery assistant procedure and optionally restart it again.

Value 10: Accept a discovery assistance request on the band defined by the Band ID, operating class, channel number and BSSID. The STA receiving this information element processes the information in the element and continues on with the discovery assistant procedure, including transmitting or receiving beamforming frames or beacons.

Value 11: Reject discovery assistance feature based on the band defined by the Band ID, operating class, channel number and BSSID, by reason of a different BSS being suggested. The STA receiving this element will have to abort the discovery assistant procedure and optionally restart it again.

The Time Unit subfield indicates the time unit for the next beamforming frame exchange field. By way of example and not limitation, the time units are defined with the following values: value 0 indicates 1 μs, 1 indicates 100 μs, 2 indicates 400 μs and values 3-15 are presently reserved. The new STA uses these field values to know the time unit of the next beamforming frame.

The Beamforming Period (BIs) subfield indicates the number of beacon intervals or TDD slots following the Time to next beamforming frame during which the DMG Beacon frame or beamforming frames will not be present. The discovered STA transmits beacons or beamforming frames every Beamforming Period. The discovered STA might expect beamforming frames or Probe Requests from the new STA every Beamforming Period.

The Fragmented TXSS subfield is set to a first state (e.g., 1) to indicate the TXSS is a fragmented sector sweep, and is set to a second state (e.g., 0) to indicate the TXSS is a complete sector sweep to inform the STA that the beamforming or beacon sweep is spanning multiple beacon intervals in case of passive scanning.

The TXSS Span subfield indicates the number of beacon intervals required for the STA sending the DMG Beacon frame to complete the TXSS phase. This subfield is always greater than or equal to 1. The new STA uses this information to decide on the end of the scanning process more quickly than if no beamforming frame was received for the TXSS span period, while it also can be utilized to increase the efficiency of the beamforming process.

The Active/Passive Scanning Indication provides indicates on the type of requested or offered DA. If the element is sent in a DA request, this field indicates that the DA is requested to be performed as active scanning or as passive scanning. If the element is sent in a DA response, this field indicates that the DA is will be performed as active scanning or as passive scanning. When a STA receives the element in a request frame, it should allocate resources and schedule transmission or reception according to the requested DA if the request is accepted. The STA responds with the element and indicates the type of scanning expected in the DA response. The new STA uses this subfield to decide on the type of scanning it is using to discovery neighboring STAs.

10.2. Extended Schedule Element

Figure 26:
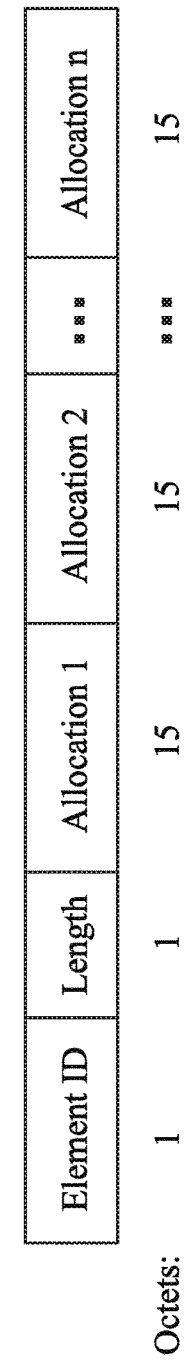
FIG. 26 is a data field diagram of a an Extended Schedule element containing information about the allocations in the mmW band according to an embodiment of the present disclosure.

FIG. 26 illustrates an example embodiment 560 of an Extended Schedule element containing information about the allocations in the mmW band. The element is shown with an Element ID, Length and one or more allocations, depicted as Allocation 1, Allocation 2, through to Allocation n. The new STA uses this element to extract information about the allocations on the mmW band and if anyone is allocated to it for discovery. The new STA might make a decision about joining or not joining the BSS based on the information in the extended schedule element. The extended schedule information can have a similar structure like the one defined in 802.11 WLAN standards.

FIG. 27 illustrates an example embodiment 570 of the subfield format for allocations depicted in FIG. 26. Each allocation field contains the following fields in addition to other subfields as shown in the figure. The Allocation Control subfield contains control information for the allocation, as is described below for FIG. 28. The BF Control subfield contains information about the type of beamforming training to carry in the allocated slot (e.g., Initiator TXSS or Responder TXSS) and the number of training sectors used for training from initiator and or responder and the total number of RX DMG antennas.

The Source and Destination AID represent the ID for the source and Destination. If the source is the discovered STA and the destination is the new STA, the new STA performs passive discovery. If the source ID is the new STA and the destination ID is the discovered STA the new STA performs active discovery. The new STA can obtain a temporary AID from the BSS STA Since the AID is not yet assigned to the station on the mmW band. Alternatively, the BSS STA assigns reserved value of the AID to the new STA. In this case, AID value of 0 (which is reserved) is used for this transaction.

The Allocation start time subfield indicates the time at which the allocation starts. The Allocation Block Duration, the Number of Blocks and the Allocation Block Period subfields indicate the allocation periods and if it will repeat in the same BI after the Allocation Start.

FIG. 28 illustrates an example embodiment 580 of the Allocation Control subfield formats. In addition to other subfields the Allocation ID is defined to indicate a unique ID for this allocation. Also, the Allocation Type is set to the type of channel access whether this allocation is CBAP, SP or TDD SP. The Pseudo-static subfield can be used to indicate that the allocation is static and that the allocation is valid for the length of the Discovery Assistance Window Length. The Other fields of Truncatable, Extendable, PCP active, LP SC Used, are utilized in the same context as defined in WLAN 802.11 standards.

10.3. DMG Capability Element

The directional multi-Gigabit (DMG) capability element carries information about the DMG capabilities (mmW band capability) of the STA on the mmW band. The new STA and BSS STA can exchange their DMG capabilities with each other so as to be made aware of each other's capabilities toward optimizing the discovery and beamforming process. The new STA can send the DMG capability information element to the BSS STA on the lower band where it can communicate with the BSS STA. By way of example and not limitation, the DMG capability information element can be sent with the FST Setup Request frame to indicate the DMG capabilities of the new STA on the mmW band. The BSS STA can send the DMG capability information element to the new STA on the lower band. The DMG capability information element can be sent, for example, with the FST Setup Response frame and indicates the DMG capabilities of the BSS STA on the mmW band.

FIG. 29 illustrates an example embodiment 590 of a DMG capability element. The Element ID, and Length fields define the ID of the element and its length. The STA Address subfield contains the MAC address of the STA. The AID subfield contains the AID assigned to the STA by the AP or PCP, the new STA will have this field reserved. The DMG capability information controls aspects of the DMG capabilities and is described below regarding FIG. 30. The following fields are described in the WLAN 802.11 specification, and included herein only for convenience. The AP or PCP Capability information defines some capabilities of the PCP or the AP. The DMG STA Beam Tracking Time-Limit is used to set the value for the time limit for beamtracking. The Extended SC MCS Capabilities field advertises the support of the STA for some MCSs values. The Maximum number of basic A-MSDU subframes in A-MDSU indicates the maximum number of Basic A-MSDU subframes in an A-MSDU that the DMG STA is able to receive from another DMG STA. The Maximum number of short A-MSDU subframes in A-MDSU indicates the maximum number of Short A-MSDU subfields in an A-MSDU that the DMG STA is able to receive from another DMG STA.

FIG. 30 illustrates an example embodiment 600 of subfields within the DMG STA Capability Information subfield shown in FIG. 29. The DMG capability information element contains these fields of interest in addition to other fields. It should be noted that the element is shown arbitrarily divided into sections merely for the sake of fitting the width of the drawing page, and that other fields may be included in the same context as defined in the WLAN 802.11 standard.

The following fields are described in the WLAN 802.11 specification, and included herein only for convenience. The Reverse Direction subfield (B0) indicates if the STA supports reverse direction transmission. The Higher Layer Timer Synchronization subfield (B1) indicates if the STA supports Higher Layer Timer Synchronization. The TPC subfield (B2) indicates if the STA supports transmit power control. The SPSH (spatial sharing) and Interference Mitigation subfield (B3) indicates if the STA is capable of performing the function of spatial sharing and Interference Mitigation. The Number of RX DMG Antennas subfield (B4 through B5) indicates the total number of receive DMG antennas of the STA. The Fast Link Adaptation subfield (B6) indicates if the STA supports the fast link adaptation procedure as defined in WLAN 802.11 standard, and included here only for convenience. The Total Number of Sectors subfield (B7 through B13) indicates the total number of transmit sectors the STA uses in a transmit sector sweep combined over all DMG antennas, including any LBIFS required for DMG antenna switching The value represented by the RXSS Length subfield (B14 through B19) specifies the total number of receive sectors combined over all receive DMG antennas of the STA, including any LBIFS required for DMG antenna switching. The DMG Antenna Reciprocity (B20) subfield is set to a first state (e.g., 1) to indicate that the best transmit DMG antenna of the STA is the same as the best receive DMG antenna of the STA and vice versa. Otherwise, this subfield is set to a second state (e.g., 0).

The A-MPDU parameters (B21 through B26) define the parameters for the A-MPDU. The BA with Flow Control (B27) indicates if the STA supports block ACK with flow control. The supported MCS set (B28 through B51) indicates which MCSs a STA supports. The DTP supported subfield (B52) indicates if the STA supports dynamic tone pairing. The A-PPDU Supported subfield (B53) indicates if the STA supports A-PPDU aggregation. The Supports Other AID subfield (B55) indicates how the STA sets its AWV configuration. The Antenna Pattern Reciprocity subfield (B56) is set to 1 to indicate that the transmit antenna pattern associated with an AWV is the same as the receive antenna pattern for the same AWV; otherwise this subfield is set to 0. The Heartbeat Elapsed Indication subfield (B57 through B59) indicates if the STA expects to receive a heartbeat frame. The Grant ACK supported subfield (B60) indicates if the STA is capable of responding to a Grant frame with a Grant ACK frame. The RXSS TxR ATE Supported subfield (B61) indicates if the STA can perform an RXSS with SSW frames transmitted at MCS 1 of the DMG SC modulation class. Currently there are Reserved fields (B61 through B62).

To the above has been added a discovery assistance supported subfield (B62) according to the present disclosure to indicate if the STA supports discovery assistance. The Discovery Assistance Supported subfield is set to a first state (e.g., 1) to indicate that the STA supports discovery assistance and to a second state (e.g., 0) to indicate otherwise. If this field is set to 1, the STA should respond to discovery assistance requests whenever it receives ones. Also the STA is capable of providing discovery assistance to STAs requesting it and propagating the request if necessary to other STAs. Other fields are used in the same context as they are defined in WLAN 802.11 standard. Other fields are used in the same contest as defined in WLAN 802.11 standards.

10.4. Information Request Frame Format

FIG. 31 illustrates an example embodiment 610 of an Information Request frame. The Category field and DMG Action field define the type of the frame. The Subject Address field contains the MAC address of the STA whose information is being requested. If this frame is sent to the PCP and the value of the Subject Address field is the broadcast address, then the STA is requesting information regarding all associated STAs. The Request element field contains IDs of elements request to be transmitted. The DMG Capabilities element carries information about the transmitter STA and other STAs known to the transmitter STA. The Zero or more Provided Elements are elements that the transmitter of this frame is providing to the destination of the frame, for example discovery assistance element. The Zero or more Extended Request Elements are element IDs requested to be transmitted to the STA.

10.5. Information Response Frame Format

FIG. 32 illustrates an example embodiment 630 of an information Response frame. The Category field and DMG Action field define the type of the frame. The Subject Address field contains the MAC address of the STA whose information is being provided. If this field is set to the broadcast address, then the STA is providing information regarding all associated STAs. The Zero or more DMG Capabilities Elements carries information about the transmitter STA and other STAs known to the transmitter STA. The Zero or More Requested Element field contains IDs of element requests to be transmitted. The requested elements are those returned in response to an Information Request frame. The Zero or more Provided Request Elements are elements that the transmitter of this frame provides to the destination of the frame, either in addition to the requested elements, or in an unsolicited Information Response frame, for example discovery assistance element.

11. Summary of Disclosure Elements

The following summary discloses certain important elements of the instant disclosure, however the summary is not to be construed as describing the only important elements of the disclosure.

An AP/PCP receiving a discovery assistance request from a new STA on a lower band (e.g., non-directional sub-6 GHz band) requesting assistance to establish a link on the mmW band (e.g., upper band directional mmW band) forwards this request to neighboring BSSs as follows. (a) A discovery assistance request including the discovery assistance element and the DMG capability element of the new STA is forwarded to the other STAs in the BSS of the AP/PCP. (b) If the STAs receiving the forwarded DA request are in a wireless device that operates other BSSs, the request is forwarded to the other STAs in the wireless device that are part of other BSSs. (c) The request can be forwarded in the neighbor BSS to the AP/PCP of this BSS to make a decision about accepting the DA request if it is supported. (d) Once the request is forwarded to the other BSSs, a decision is taken, by the AP/PCP in this BSS, to assist the new STA by accepting or rejecting the discovery assistance request. (e) The AP/PCP of the neighboring BSS sends a response and propagates it to the BSS where the new STA is located through the wireless device that connects the two BSSs. (f) The DA response is propagated to the AP of the BSS where the new STA is connected to. (g) The AP/PCP collects all responses from neighboring BSSs and sends one DA response including discovery campaign details to the new STA.

A discovery assistance request and discovery assistance response in the mmW band is transmitted by sending an information request frame and information response frame, respectively, containing a discovery assistance element attached thereto.

The AP/PCP in the BSS of the new STA sends the new STA the MAC address of the STAs providing DA in the DA response sent to it.

The AP/PCP in the BSS of the new STA collects all responses from neighboring STAs and sends the new STA the response through the lower band. The details of the DA campaign are conveyed in one of the following two ways. (a) Sending the extended schedule element with the DA response to the new STA including the allocations of the APs/PCPs providing DA. (b) Sending the start time and the DA window length of the discovery assistance campaign of all APs/PCPs participating.

12. General Scope of Embodiments

The enhancements described in the presented technology can be readily implemented within the protocols (e.g., programming executing on the processor of the station) of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, comprising: (a) a wireless communication circuit configured as a station for wirelessly communicating with at least one other station, using directional communications; (b) a processor coupled to said wireless communication circuit within a station configured for operating on a wireless network; and (c) a non-transitory memory storing instructions executable by the processor; (d) wherein said instructions, when executed by the processor, perform one or more steps comprising: (d)(i) performing directional communications with one or more other stations on the wireless network over directional antenna sectors selected from a plurality of directional antenna sectors; (d)(ii) receiving a discovery assistance request at this station operating as an AP or PCP, from a first neighboring station which is seeking discovery assistance in discovering stations on the wireless network; (d)(iii) forwarding the received discovery assistance request to one or more neighboring stations in a BSS of this station and to stations in a neighboring BSS, comprising: (d)(iii)(A) forwarding a discovery assistance request including a discovery assistance element and a DMG capability element of the first neighboring station, to other stations in the BSS of this station which are operating as an AP or PCP station; (d)(iii)(B) forwarding the discovery assistance request to the other stations in a wireless communication circuit that are part of other BSSs if the other stations receiving the forwarded discovery assistance request are in a wireless communication circuit that operates on other BSSs.

2. An apparatus for wireless communication in a network, comprising: an AP/PCP receiving a discovery assistance request from a new STA on lower band requesting assistance to establish a link on the mmW band forwards this request to neighboring BSSs as follows: (a) a discovery assistance request including the discovery assistance element and the DMG capability element of the new STA is forwarded to the other STAs in the BSS of the AP/PCP; (b) if the STAs receiving the forwarded DA request are in a wireless device that operates other BSSs, the request is forwarded to the other STAs in the wireless device that are part of other BSSs; (c) the request might be forwarded in the neighbor BSS to the AP/PCP of this BSS to make a decision about accepting the DA request if it is supported; (d) once the request is forwarded to the other BSS, a decision is taken to assist the new STA by accepting or rejecting the discovery assistance request by the AP/PCP in this BSS; (e) the AP/PCP of the neighboring BSS send a response and propagating it to the BSS where the new STA is through the wireless device that connects the two BSSs; (f) the DA response is propagated to the AP of the BSS where the new STA is connected to; (g) the AP/PCP collects all responses from neighboring BSS and send one DA response to the new STA including the discovery campaign details.

3. A method of performing wireless communication in a network, comprising: (a) performing directional communications from a wireless communication circuit configured as a station for wirelessly communicating with at least one other station using directional communications on the wireless network over directional antenna sectors selected from a plurality of directional antenna sectors; (b) receiving a discovery assistance request, at this station operating as an AP or PCP, from a first neighboring station which is seeking discovery assistance in discovering stations on the wireless network; and (c) forwarding the received discovery assistance request to one or more neighboring stations in a BSS of this station and to stations in a neighboring BSS, comprising: (c)(i) forwarding a discovery assistance request including a discovery assistance element and a DMG capability element of the first neighboring station, to other stations in the BSS of this station operating as an AP or PCP station; or (c)(ii) forwarding the discovery assistance request to the other stations in a wireless communication circuit that are part of other BSSs if the other stations receiving the forwarded discovery assistance request are in a wireless communication circuit that operates on other BSSs.

4. The apparatus or method of any preceding embodiment, wherein instructions executed by a processor further perform one or more steps comprising receiving the discovery assistance request on either a directional or non-directional communication band.

5. The apparatus or method of any preceding embodiment, wherein instructions executed by a processor further perform one or more steps comprising forwarding said discovery assistance request to the AP or PCP on the other BSSs, to allow the AP or PCP on the other BSSs to make a decision on whether or not to accept the discovery assistance request.

6. The apparatus or method of any preceding embodiment, wherein instructions executed by a processor further perform one or more steps comprising determining whether or not to assist the first neighboring station which is seeking discovery assistance, on condition of the station of this apparatus operating as the AP or PCP in its BSS after it has forwarded the discovery assistance requests to other stations of other BSSs.

7. The apparatus or method of any preceding embodiment, wherein instructions executed by a processor further perform one or more steps comprising sending a response to the discovery assistance request and propagating it through a wireless communication circuit that connects the BSS of this station to reach a BSS of the first neighboring station which is seeking discovery assistance, on condition that the station of this apparatus is operating as the AP or PCP in its BSS and has received a forwarded discovery assistance request from another BSS.

8. The apparatus or method of any preceding embodiment, wherein instructions executed by a processor further perform one or more steps comprising propagating the discovery assistance request to the AP or PCP of the BSS where the first neighboring station located.

9. The apparatus or method of any preceding embodiment, wherein instructions executed by a processor further perform one or more steps comprising sending one discovery assistance response containing discovery campaign details to the first neighboring station, in response to collecting responses from stations in neighboring BSSs.

10. The apparatus or method of any preceding embodiment, wherein instructions executed by a processor further perform one or more steps comprising transmitting discovery assistance request and response messages in a directional communications band by transmitting information request frames and information response frames each containing attached discovery assistance elements.

11. The apparatus or method of any preceding embodiment, wherein instructions executed by a processor further perform one or more steps comprising sending the MAC addresses, within a discovery assistance response, of stations providing discovery assistance to the first neighboring station requesting discovery assistance, when operating as the AP or PCP in the BSS of the first neighboring station.

12. The apparatus or method of any preceding embodiment, wherein instructions executed by a processor further perform one or more steps comprising collecting all responses from neighboring stations and sending these responses through a non-directional communications band to the first neighboring station requesting discovery assistance, when operating as the AP or PCP in the BSS of the first neighboring station.

13. The apparatus or method of any preceding embodiment, wherein instructions executed by a processor further perform one or more steps comprising sending details of a discovery assistance campaign by either: (a) sending an extended schedule element, comprising allocation information of APs and/or PCPs providing the discovery assistance, within a discovery assistance response to the first neighboring station requesting discovery assistance; or (b) sending a start time and a discovery assistance window length for the discovery assistance campaign of APs and/or PCPs providing the discovery assistance, when operating as the AP or PCP in the BSS of the first neighboring station.

14. The apparatus or method of any preceding embodiment, wherein said station comprises an extended directional multi-gigabyte personal basic service set control point (PCP), or an access point (AP) that enables the distributed scheduling protocol and advertises it by setting a distributed scheduling enabled field in a transmitted extended directional multi-gigabit (EDMG) extended schedule element.

15. The apparatus or method of any preceding embodiment, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

16. The apparatus or method of any preceding embodiment, wherein discovery assistance request and discovery assistance response in the mmW band is transmitted by sending an information request frame and information response frame, respectively with discovery assistance element attached to it.

17. The apparatus or method of any preceding embodiment, wherein the AP/PCP in the BSS of the new STA sends the new STA the MAC address of the STAs providing DA in the DA response sent to it.

18. The apparatus or method of any preceding embodiment, wherein the AP/PCP in the BSS of the new STA collects all responses from neighboring STAs and send the new STA the response through the lower band, with details of the DA campaign conveyed using one of the following two ways: (a) sending the extended schedule element with the DA response to the new STA including the allocations of the APs/PCPs providing DA; and (b) sending the start time and the DA window length of the discovery assistance campaign of all APs/PCPs participating.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
    (a) a wireless communication circuit configured as a station for wirelessly communicating with at least one other station over a wireless network, each said station having at least one communications band in which the station can operate as an access point (AP), personal basic service set (PBSS) control point (PCP) or regular station, in either separate devices or as stations of a multi-station device each station of which can be joined to a different BSS; wherein a multiple-MAC station management entity (MM-SME) is incorporated in each multi-station device for coordinating operations across multiple medium access control (MAC) sublayers;
    (b) a processor coupled to said wireless communication circuit within a station configured for operating on the wireless network; and
    (c) a non-transitory memory storing instructions executable by the processor;
    (d) wherein said instructions, when executed by the processor, perform steps comprising:
        (i) performing directional communications with one or more other stations on the wireless network over directional antenna sectors selected from a plurality of directional antenna sectors;
        (ii) receiving a discovery assistance request at this station from a first neighboring station which is seeking discovery assistance in discovering stations on the wireless network; and
        (iii) forwarding the received discovery assistance request to one or more neighboring stations in a BSS of this station and to stations in a neighboring BSS, comprising:
            (A) forwarding a discovery assistance request including a discovery assistance element and a directional multi-gigabit (DMG) capability element of the first neighboring station, to other stations in the BSS of this station; and
            (B) forwarding the discovery assistance request through a multi-station device in response to receiving the discovery assistance request in a MAC layer management entity (MLME) of a station on the BSS from which the discovery assistance request was received, passing the discovery assistance request to the MM-SME which coordinates passing the discovery assistance request to the MLME of another station on the multi-station device which forwards the discovery assistance request to stations on a different BSS from the one in which it was received.

2. The apparatus as recited in claim 1, wherein said instructions when executed by the processor perform one or more steps comprising receiving the discovery assistance request on either a directional or non-directional communication band.

3. The apparatus as recited in claim 1, wherein said instructions when executed by the processor further comprises forwarding said discovery assistance request to the AP or PCP on other BSSs, to allow the AP or PCP on the other BSSs to make a decision on whether or not to accept the discovery assistance request.

4. The apparatus as recited in claim 1, wherein said instructions when executed by the processor further comprises determining whether or not to assist the first neighboring station which is seeking discovery assistance, on condition of the station of this apparatus operating as the AP or PCP in its BSS after it has forwarded the discovery assistance requests to other stations of other BSSs.

5. The apparatus as recited in claim 1, wherein said instructions when executed by the processor further comprises sending a response to the discovery assistance request and propagating it through a wireless communication circuit that connects two BSSs at a multi-station device whose multiple-MAC station management entity (MM-SME) coordinates communications between MAC layer management entities (MLMEs) between two stations operating on different BSSs to reach a BSS of the first neighboring station which is seeking discovery assistance, on condition that the station of this apparatus is operating as the AP or PCP in its BSS and has received a forwarded discovery assistance request from another BSS.

6. The apparatus as recited in claim 5, wherein said instructions when executed by the processor further comprises propagating the discovery assistance request to the AP or PCP of the BSS where the first neighboring station located.

7. The apparatus as recited in claim 1, wherein said instructions when executed by the processor further comprises sending one discovery assistance response containing discovery campaign details to the first neighboring station, in response to collecting responses from stations in neighboring BSSs.

8. The apparatus as recited in claim 1, wherein said instructions when executed by the processor perform one or more steps comprising transmitting discovery assistance request and response messages in a directional communications band by transmitting information request frames and information response frames each containing attached discovery assistance elements.

9. The apparatus as recited in claim 1, wherein said instructions when executed by the processor further comprises sending MAC addresses, within a discovery assistance response, of stations providing discovery assistance to the first neighboring station requesting discovery assistance, when operating as the AP or PCP in the BSS of the first neighboring station.

10. The apparatus as recited in claim 1, wherein said instructions when executed by the processor further comprises collecting all responses from neighboring stations and sending these responses through a non-directional communications band to the first neighboring station requesting discovery assistance, when operating as the AP or PCP in the BSS of the first neighboring station.

11. The apparatus as recited in claim 10, wherein said instructions when executed by the processor further comprises sending details of a discovery assistance campaign by either: (a) sending an extended schedule element, comprising allocation information of APs and/or PCPs providing the discovery assistance, within a discovery assistance response to the first neighboring station requesting discovery assistance; or (b) sending a start time and a discovery assistance window length for the discovery assistance campaign of APs and/or PCPs providing the discovery assistance, when operating as the AP or PCP in the BSS of the first neighboring station.

12. The apparatus as recited in claim 1, wherein said station comprises an extended directional multi-gigabyte personal basic service set control point (PCP), or an access point (AP) that enables distributed scheduling protocol and advertises it by setting a distributed scheduling enabled field in a transmitted extended directional multi-gigabit (EDMG) extended schedule element.

13. The apparatus as recited in claim 1, wherein said apparatus is applicable to network applications selected from the group of network types and applications consisting of: device-to-device (D2D), peer-to-peer (P2P), wireless and mesh networking applications, wireless personal area networks (WPAN), outdoor wireless communications, Wi-Fi, WiGig, Internet of things (IoT) applications, backhauling of data, fronthauling of data, indoor and outdoor distribution networks, mesh networks, a next generation of cellular networks, and a next generation of cellular networks with D2D communications.

14. An apparatus for wireless communication in a network, comprising:
(a) a wireless communication circuit configured as a station for wirelessly communicating with at least one other station over a wireless network, each said station having at least one communications band in which the station can operate as an access point (AP), personal basic service set (PBSS) control point (PCP) or regular station, in either separate devices or as stations of a multi-station device each station of which can be joined to a different BSS; wherein a multiple-MAC station management entity (MM-SME) is incorporated in each multi-station device for coordinating operations across multiple medium access control (MAC) sublayers;
(b) a processor coupled to said wireless communication circuit within a station configured for operating on the wireless network; and
(c) a non-transitory memory storing instructions executable by the processor;
(d) wherein said instructions, when executed by the processor, perform steps comprising:
(i) performing directional communications with one or more other stations on the wireless network over directional antenna sectors selected from a plurality of directional antenna sectors;
(ii) receiving a discovery assistance request at this station from a first neighboring station which is seeking discovery assistance in discovering stations on the wireless network; and
(iii) forwarding the received discovery assistance request to one or more neighboring stations in a BSS of this station and to stations in a neighboring BSS, comprising:
(A) forwarding a discovery assistance request including a discovery assistance element and a directional multi-gigabit (DMG) capability element of the first neighboring station, to other stations in the BSS of this station; and
(B) forwarding the discovery assistance request through a multi-station device and its associated MM-SME to the other stations in a wireless communication circuit that are part of other BSSs if the other stations receiving the forwarded discovery assistance request are in a wireless communication circuit that operates on other BSSs, or forwarding said discovery assistance request to the AP or PCP on the other BSSs for them to make a decision whether or not to accept the discovery assistance request; and
(C) wherein forwarding of the discovery assistance request is performed in response to receiving the discovery assistance request in a MAC layer management entity (MLME) of a station on the BSS from which the discovery assistance request was received, passing the discovery assistance request to the MM-SME which coordinates passing the discovery assistance request to the MLME of another station on the multi-station device which forwards the discovery assistance request to stations on a different BSS from the one in which it was received.

15. The apparatus as recited in claim 14, wherein said instructions when executed by the processor perform one or more steps comprising receiving the discovery assistance request on either directional or non-directional communication bands.

16. The apparatus as recited in claim 14, wherein said instructions when executed by the processor further comprises determining at this station whether or not to assist the first neighboring station which is seeking discovery assistance, with this determination being made at this station which is operating as the AP or PCP in its BSS after forwarding the discovery assistance requests to the other stations of other BSSs.

17. The apparatus as recited in claim 14, wherein said instructions when executed by the processor further comprises sending a response to the discovery assistance request and propagating it through a wireless communication circuit that connects two BSSs at a multi-station device whose multiple-MAC station management entity (MM-SME) coordinates communications between MAC layer management entities (MLMEs) between two stations operating on different BSSs to reach the BSS of the first neighboring station which is seeking discovery assistance, these actions performed in response to said station operating as the AP or PCP in its BSS and having received a forwarded discovery assistance request from another BSS.

18. The apparatus as recited in claim 14, wherein said instructions when executed by the processor further comprises collecting responses from stations in neighboring BSSs and conveying this information as discovery campaign details in a single discovery assistance response to the first neighboring station.

19. The apparatus as recited in claim 14, wherein said instructions when executed by the processor further comprises sending MAC addresses within a discovery assistance response of stations providing discovery assistance to the first neighboring station requesting discovery assistance, when the station is operating as the AP or PCP in the same BSS as the first neighboring station.

20. A method of performing wireless communication in a network, comprising:
(a) performing directional communications from a wireless communication circuit configured as a station for wirelessly communicating with at least one other station using directional communications on the wireless network over directional antenna sectors selected from a plurality of directional antenna sectors;
(b) receiving a discovery assistance request, at this station, from a first neighboring station which is seeking discovery assistance in discovering stations on the wireless network; and
(c) forwarding the received discovery assistance request to one or more neighboring stations in a basic service set (BSS) of this station and to stations in a neighboring BSS, comprising:
  (i) forwarding a discovery assistance request including a discovery assistance element and a directional multi-gigabit (DMG) capability element of the first neighboring station, to other stations in the BSS of this station; or
  (ii) forwarding the discovery assistance request through a multi-station device and its associated multiple MAC station management entity (MM-SME) to the other stations in a wireless communication circuit that are part of other BSSs if the other stations receiving the forwarded discovery assistance request are in a wireless communication circuit that operates on other BSSs; and
  (iii) wherein forwarding of the discovery assistance request is performed in response to receiving the discovery assistance request in the MAC layer management entity (MLME) of a station on the BSS from which the discovery assistance request was received, passing the discovery assistance request to the MM-SME which passes the discovery assistance request to the MLME of another station on the multi-station device which forwards the discovery assistance request to stations on a different BSS from the one in which it was received.

\* \* \* \* \*